United States Patent
Cushman et al.

(10) Patent No.: US 12,329,159 B2
(45) Date of Patent: Jun. 17, 2025

(54) SYSTEMS AND METHODS FOR USE OF CHLORINE DIOXIDE IN CULTIVATION AND POST-HARVEST APPLICATIONS

(71) Applicant: Prokure Solutions, LLC, Phoenix, AZ (US)

(72) Inventors: Alex Joseph Cushman, Phoenix, AZ (US); Bret Bernard Lorenz, Phoenix, AZ (US); Noah Lustig, Phoenix, AZ (US)

(73) Assignee: Prokure Solutions, LLC, Phoenix, AZ (US)

( * ) Notice: Subject to any disclaimer, the term of this patent is extended or adjusted under 35 U.S.C. 154(b) by 12 days.

(21) Appl. No.: 17/373,544

(22) Filed: Jul. 12, 2021

(65) Prior Publication Data

US 2021/0329921 A1 Oct. 28, 2021

Related U.S. Application Data

(63) Continuation-in-part of application No. 16/714,577, filed on Dec. 13, 2019, now Pat. No. 11,696,583.

(60) Provisional application No. 63/051,238, filed on Jul. 13, 2020, provisional application No. 62/799,736, filed on Jan. 31, 2019, provisional application No. 62/779,366, filed on Dec. 13, 2018.

(51) Int. Cl.
| | | |
|---|---|---|
| *A01N 59/00* | (2006.01) | |
| *A01G 7/00* | (2006.01) | |
| *A01G 7/02* | (2006.01) | |
| *A01N 59/04* | (2006.01) | |

(52) U.S. Cl.
CPC .............. *A01N 59/00* (2013.01); *A01G 7/00* (2013.01); *A01G 7/02* (2013.01); *A01N 59/04* (2013.01)

(58) Field of Classification Search
CPC .................................. A01N 59/00; A01G 7/00
See application file for complete search history.

(56) References Cited

U.S. PATENT DOCUMENTS

| | | | |
|---|---|---|---|
| 4,019,983 A | 4/1977 | Mandt | |
| 4,339,250 A | 7/1982 | Thut | |
| 4,499,077 A | 2/1985 | Stockel | |
| 5,227,306 A | 7/1993 | Eltomi | |
| 5,357,636 A | 10/1994 | Dresdner, Jr. | |
| 5,364,593 A | 11/1994 | Mihaylov | |
| 5,382,520 A | 1/1995 | Jenson | |
| 5,468,645 A | 11/1995 | Kirollos | |
| 5,707,739 A | 1/1998 | Wellinghoff | |
| 5,853,689 A | 12/1998 | Klatte | |
| 5,858,443 A | 1/1999 | Hei | |
| 5,861,096 A | 1/1999 | Mason | |
| 5,885,543 A | 3/1999 | Klatte | |
| 5,922,776 A | 7/1999 | Wellinghoff | |
| 5,942,408 A | 8/1999 | Christensen | |
| 6,042,802 A | 3/2000 | Drake | |
| 6,077,495 A | 6/2000 | Speronello | |
| 6,132,748 A | 10/2000 | Khanna | |
| 6,284,198 B1 | 9/2001 | Kirollos | |
| 6,343,653 B1 | 2/2002 | Mason | |
| 6,379,643 B1 | 4/2002 | Klatte | |
| 6,436,444 B1 | 8/2002 | Richter | |
| 6,468,479 B1 | 10/2002 | Mason | |
| 6,503,419 B2 | 1/2003 | Klatte | |
| 6,564,808 B1 | 5/2003 | Hempfling | |
| 6,602,466 B2 | 8/2003 | Hamilton | |
| 6,607,696 B1 | 8/2003 | Hamilton | |
| 6,645,457 B2 | 11/2003 | Mason | |
| 6,676,850 B2 | 1/2004 | Speronello | |
| 6,716,354 B2 | 4/2004 | Rosenblatt | |
| 6,749,869 B1 | 6/2004 | Richter | |
| 6,764,661 B1 | 7/2004 | Girard | |
| 7,195,744 B2 | 3/2007 | Kilawee | |
| 7,220,367 B2 | 5/2007 | Speronello | |
| 7,264,773 B2 | 9/2007 | Adiga | |
| 7,323,138 B2 | 1/2008 | Speronello | |
| 7,407,624 B2 | 8/2008 | Cumberland | |
| 7,549,425 B2 | 6/2009 | Koga | |
| 7,549,426 B2 | 6/2009 | Koga | |
| 7,670,551 B2 | 3/2010 | Kadlec | |
| 7,678,388 B2 | 3/2010 | Mason | |
| 7,803,315 B2 | 9/2010 | McDonnell | |
| 7,807,101 B2 | 10/2010 | Mason | |
| 7,922,984 B2 | 4/2011 | Hamilton | |
| 8,043,861 B2 | 10/2011 | Locke | |

(Continued)

FOREIGN PATENT DOCUMENTS

| | | |
|---|---|---|
| AU | 1970018990 A1 | 8/1970 |
| AU | 1982083890 A1 | 4/1983 |

(Continued)

OTHER PUBLICATIONS

English machine translation of JP-3169115-U made Jun. 1, 2023. (Year: 2023).*
Yao et al., "Inactivation Effect of Chlorine Dioxide on Phytopathogenic Bacteria in Irrigation Water," Journal of Environmental Engineering and Management, vol. 20, No. 3, May 2010 (4 pages).
Park et al., "Abstract: Effect of relative humidity on inactivation of foodborne pathogens using chlorine dioxide gas and its residues on tomatoes," Letters in Applied Microbiology, vol. 67, No. 2, retrieved Jan. 17, 2019 from <https://onlinelibrary.wiley.com/doi/abs/10.1111/lam.13002> (2 pages).

*Primary Examiner* — Michael B. Pallay
(74) *Attorney, Agent, or Firm* — KW Law, LLP

(57) ABSTRACT

Systems and methods of use of chlorine dioxide in controlled environmental agriculture settings and postharvest applications are provided. A method can comprise application of gaseous chlorine dioxide at a level effective to prevent microbial proliferation in a setting containing growing plants. A system can comprise a chemical microorganism control agent dispersal system, an airborne microorganism detection system, and a cultivation environment monitor system.

20 Claims, 6 Drawing Sheets

(56) References Cited

U.S. PATENT DOCUMENTS

| | | |
|---|---|---|
| 8,089,367 B2 | 1/2012 | Locke |
| 8,192,684 B2 | 6/2012 | Mason |
| 8,361,409 B2 | 1/2013 | Rico |
| D676,949 S | 2/2013 | Dornau |
| 8,440,144 B2 | 5/2013 | Pedro |
| 8,486,431 B2 | 7/2013 | Ogata |
| 8,524,167 B2 | 9/2013 | Regits |
| 8,609,594 B2 | 12/2013 | Mason |
| 8,622,209 B2 | 1/2014 | Isaac |
| D702,628 S | 4/2014 | Williams |
| 8,703,656 B2 | 4/2014 | Mason |
| 8,741,223 B2 | 6/2014 | Mason |
| 8,789,592 B2 | 7/2014 | Mason |
| 8,920,717 B2 | 12/2014 | Nelson |
| 8,991,500 B2 | 3/2015 | Mason |
| D726,105 S | 4/2015 | Williams |
| 8,997,862 B2 | 4/2015 | Mason |
| 9,078,939 B2 | 7/2015 | Dornau |
| 9,125,427 B2 | 9/2015 | Dull |
| 9,227,156 B2 | 1/2016 | Richardson |
| 9,238,587 B2 | 1/2016 | Mason |
| 9,295,262 B2 | 3/2016 | Kato |
| 9,327,235 B2 | 5/2016 | Richardson |
| 9,340,756 B2 | 5/2016 | Speronello |
| 9,382,116 B2 | 7/2016 | Isaac |
| 9,414,611 B2 | 8/2016 | Ernst |
| 9,533,063 B1 | 1/2017 | Savage |
| 9,656,865 B2 | 5/2017 | McWhorter |
| 9,738,520 B2 | 8/2017 | Fujita |
| 9,880,092 B2 | 1/2018 | Foy |
| 9,901,098 B2 | 2/2018 | Bell |
| 9,901,105 B2 | 2/2018 | Ernst |
| 9,908,098 B2 | 3/2018 | House |
| 10,005,665 B2 | 6/2018 | Richardson |
| 10,039,782 B2 | 8/2018 | Roe |
| 10,087,362 B2 | 10/2018 | Mason |
| 10,233,100 B2 | 3/2019 | Mason |
| 10,239,032 B2 | 3/2019 | Takigawa |
| 10,279,658 B2 | 5/2019 | Zhang et al. |
| 10,285,382 B2 | 5/2019 | Lee |
| 10,308,533 B2 | 6/2019 | Mason |
| 10,343,115 B2 | 7/2019 | Temple |
| 10,399,409 B2 | 9/2019 | Wang |
| 10,442,711 B2 | 10/2019 | Mason |
| 10,455,844 B2 | 10/2019 | Ernst et al. |
| 10,456,785 B2 | 10/2019 | Daniels |
| 10,526,529 B2 | 1/2020 | Mason |
| 10,526,530 B2 | 1/2020 | Mason |
| 10,588,991 B1 | 3/2020 | Dornau |
| 10,610,847 B2 | 4/2020 | Richardson |
| 2001/0053333 A1 | 12/2001 | Messier |
| 2003/0053931 A1 | 3/2003 | Hamilton |
| 2003/0091497 A1 | 5/2003 | Mason |
| 2003/0143111 A1 | 7/2003 | Cowley |
| 2004/0241065 A1 | 12/2004 | Kampa |
| 2004/0259188 A1 | 12/2004 | Rosenblatt |
| 2005/0107276 A1 | 5/2005 | Merritt |
| 2005/0268573 A1 | 12/2005 | Yan |
| 2006/0068029 A1 | 3/2006 | Mason |
| 2006/0127273 A1 | 6/2006 | Kampa |
| 2006/0185851 A1 | 8/2006 | Grimshaw |
| 2006/0280665 A1 | 12/2006 | Rees |
| 2007/0134045 A1 | 6/2007 | Holt |
| 2007/0237671 A1 | 10/2007 | Yuan |
| 2007/0257127 A1 | 11/2007 | Iverson |
| 2008/0131395 A1 | 6/2008 | Wellinghoff |
| 2008/0213391 A1 | 9/2008 | Kaiser |
| 2008/0241323 A1 | 10/2008 | Kelsey |
| 2009/0062156 A1 | 3/2009 | Wilson |
| 2009/0078911 A1 | 3/2009 | Shibata |
| 2009/0081310 A1 | 3/2009 | Mason |
| 2009/0304810 A1 | 12/2009 | Martin |
| 2010/0278687 A1 | 11/2010 | Mason |
| 2011/0024367 A1 | 2/2011 | Martin |
| 2012/0225171 A1 | 9/2012 | Garwood |
| 2012/0321511 A1 | 12/2012 | Lorcheim |
| 2013/0032547 A1 | 2/2013 | Pillai |
| 2013/0164388 A1 | 6/2013 | Mason |
| 2014/0271355 A1 | 9/2014 | Mason |
| 2014/0311734 A1 | 10/2014 | Mason |
| 2014/0369953 A1 | 12/2014 | Purschwitz |
| 2015/0005205 A1 | 1/2015 | Mason |
| 2015/0010648 A1 | 1/2015 | Mason |
| 2015/0076401 A1 | 3/2015 | Mason |
| 2015/0105302 A1 | 4/2015 | Pursley |
| 2015/0114650 A1 | 4/2015 | Mason |
| 2015/0151987 A1 | 6/2015 | Theivendran |
| 2015/0197686 A1 | 7/2015 | Mason |
| 2015/0296795 A1 | 10/2015 | Harrison |
| 2015/0298346 A1 | 10/2015 | Borowka |
| 2015/0314029 A1 | 11/2015 | Jones et al. |
| 2016/0000134 A1 | 1/2016 | Sandra |
| 2016/0051714 A1* | 2/2016 | Kim ............... A23B 4/16 |
| | | 426/318 |
| 2016/0060148 A1 | 3/2016 | Mason |
| 2016/0152495 A1 | 6/2016 | Rosenblatt |
| 2016/0206767 A1 | 7/2016 | Park |
| 2016/0221826 A1 | 8/2016 | Mason |
| 2016/0318992 A1 | 11/2016 | Pomrink |
| 2017/0332674 A1 | 11/2017 | Annous |
| 2018/0009684 A1 | 1/2018 | Mason |
| 2018/0055963 A1 | 3/2018 | Richardson |
| 2018/0093003 A1 | 4/2018 | Bender |
| 2018/0113071 A1 | 4/2018 | Foy |
| 2018/0146690 A1 | 5/2018 | Ernst |
| 2018/0177905 A1 | 6/2018 | Bender |
| 2018/0243456 A1 | 8/2018 | Abbott |
| 2018/0305208 A1 | 10/2018 | Mason |
| 2018/0305209 A1 | 10/2018 | Ernst |
| 2018/0319406 A1 | 11/2018 | Dudar |
| 2018/0344888 A1 | 12/2018 | Horvath |
| 2018/0371871 A1 | 12/2018 | Mason |
| 2019/0151486 A1 | 5/2019 | Mason |
| 2019/0276218 A1 | 9/2019 | Freedman |
| 2019/0292436 A1 | 9/2019 | Mason |
| 2019/0328923 A1 | 10/2019 | Cunningham |
| 2019/0375659 A1 | 12/2019 | Mason |
| 2020/0114734 A1 | 4/2020 | Zuberbuehler |
| 2020/0198999 A1 | 6/2020 | Mason |

FOREIGN PATENT DOCUMENTS

| | | | |
|---|---|---|---|
| AU | 545171 B | 6/1983 | |
| AU | 1996070383 A1 | 5/1997 | |
| CN | 101862624 B | 9/2012 | |
| CN | 101810874 B | 4/2013 | |
| CN | 101455849 B | 8/2013 | |
| CN | 104174270 A | 12/2014 | |
| CN | 104209000 A | 12/2014 | |
| CN | 108261901 A | 7/2018 | |
| EP | 0973398 B1 | 9/2003 | |
| EP | 1899041 A4 | 4/2009 | |
| EP | 3738563 A1 | 11/2020 | |
| GB | 663239 A | 12/1951 | |
| GB | 1557282 A | 12/1979 | |
| IN | 201717028429 A | 11/2017 | |
| JP | 3169115 U * | 7/2011 | ............ A01G 7/02 |
| KR | 101654554 B1 | 9/2016 | |
| WO | 2009051266 A1 | 4/2009 | |
| WO | 2010141169 A2 | 9/2010 | |
| WO | WO-2016083792 A1 * | 6/2016 | ............ A23B 7/144 |
| WO | 2017104927 A1 | 6/2017 | |

OTHER PUBLICATIONS

Tamburini et al., "Study on Microbial Deposition and Contamination onto Six Surfaces Commonly Used in Chemical and Microbiological Laboratories," International Journal of Environmental Research and Publich Health, vol. 12, published Jul. 17, 2015 (17 pages).

Katsoulas et al., "Crop reflectance monitoring as a tool for water stress detection in greenhouses: A review," Biosystems Engineering, vol. 151, published Oct. 24, 2016 (25 pages).

(56) References Cited

OTHER PUBLICATIONS

Gibbs et al., "Gaseous Chlorine Dioxide as an Alternative for Bedbug Control," Infection Control and Hospital Epidemiology, vol. 33, No. 5, May 2012 (6 pages).
McPartland, J.M., "A review of Cannabis diseases," Journal of the International Hemp Association, vol. 3, No. 1, retrieved on Jan. 31, 2019 from <http://www.internationalhempassociation.org/jiha/iha03111.html> (7 pages).
McKernan et al., "Metagenomic analysis of medicinal Cannabis samples; pathogenic bacteria, toxigenic fungi, and beneficial microbes grow in culture-based yeast and mold tests," F1000Reasearch, vol. 5, 2016 (20 pages).
McPartland et al. "Chapter 22: Contaminants of Concern in Cannabis: Microbes, Heavy Metals and Pesticides," *Cannabis sativa* L.—Botany and Biotechnology, pp. 457-474, May 2017, retrieved from <https://www.researchgate.net/publication/318020615_Contaminants_of_Concern_in_Cannabis_Microbes_Heavy_Metals_and_Pesticides> (19 pages).
Sapers et al., "Vapor-phase Decontamination of Apples Inoculated with *Escherichia coli*," Journal of Food Science, vol. 68, No. 3, 2003 (5 pages).
Shirasaki et al., "A study of the properties of chlorine dioxide gas as a fumigant," Experimental Animals, vol. 65, No. 3, 2016 (8 pages).
"Cannabis Industry: Mold Prevention and Remediation Equipment and Services," ClorDiSys, retrieved from <chrome-extension://efaidnbmnnnibpcajpcglclefindmkaj/https://www.clordisys.com/pdfs/brochures/Cannabis%20Brochure.pdf> (8 pages).
DeGabrielle, Ketch, "10 Treatment Methods to Reduce Mold in Cannabis," Cannabis Industry Journal, retrieved on Aug. 20, 2018 from <https://www.cannabisindustryjournal.com/column/10-treatment-methods-to-reduce-mold-in-cannabis/> (7 pages).
Kaul, Swetha, "Colorado vs. California: Two Different Approaches to Mold Testing in Cannabis," Cannabis Industry Journal, retrieved on Aug. 20, 2018 from <https://www.cannabisindustryjournal.com/feature_article/colorado-vs-california-two-different-approaches-to-mold-testing-in-cannabis/> (8 pages).
ClorDiSys, "Products: Biological Indicators," retrieved on Aug. 20, 2018 from <http://www.clordisys.com/bis.php> (1 page).
ClorDiSys, "Products: CD Checkstrips," retrieved on Aug. 20, 2018 from <http://www.clordisys.com/checkstrips.php> (1 page).
Steep Hill, "Microbial Contaminant Remediation, Molds and Fungi in Cannabis," retrieved on Aug. 20, 2018 from <https://www.steephill.com/blogs/35/Microbial-Contaminant-Remediation,-Molds-and-Fungi-in-Cannabis> (7 pages).
Willow Industries, "The Data," retrieved on Aug. 20, 2018 from <https://willowindustries.com/the-data/> (10 pages).
Source Colorado, "How to Safely Eliminate Microbials from Cannabis," retrieved Aug. 20, 2018 from <http://www.yoursourceco.com/blog/safely-eliminate-microbials-cannabis?age-verified=55c7350aec> (6 pages).
Butschli, Jim. "Perforated bags provide good chemistry for ICA Tri Nova," Packaging World, retrieved on Jan. 21, 2019 from <https://www.packworld.com/print/63277> (2 pages).
Moriarty et al., "Public Health Responses to COVID-19 Outbreaks on Cruise Ships—Worldwide, Feb.-Mar. 2020," Centers for Disease Control and Prevention, Morbidity and Mortality Weekly Report, vol. 69, Mar. 23, 2020 (6 pages).
Van Doremalen et al., "Aerosol and Surface Stability of SARS-CoV-2 as Compared with SARS-CoV-1," The New England Journal of Medicine, vol. 382, No. 16, published Mar. 17, 2020 (3 pages).
ICA TriNova, LLC, "Petition for Addition of a Synthetic Substance for Inclusion on the National List," dated Nov. 30, 2015 (45 pages).
Kardinahl et al., "Abstract: Cabin Air Quality Management in Automotive Practice," Advanced Microsystems for Automotive Applications 2003, retrieved on Sep. 27, 2024 from <https://link.springer.com/chapter/10.1007/978-3-540-76988-0_33> (2 pages).
Filho, Auzebio V., "Abstract: New Vehicles Cabin Indoor Quality," SAE Technical Paper 2010-36-0390, published Oct. 5, 2010, retrieved on Sep. 27, 2024 from <https://saemobilus.sae.org/papers/new-vehicles-cabin-indoor-air-quality-2010-36-0390> (2 pages).
Dropkin, D., "Abstract: Sampling of Automobile Interiors for Organic Emissions," US Environmental Protection Agency, EPA/600/3-85/008, 1985, retrieved on Sep. 27, 2024 from <https://cfpub.epa.gov/si/si_public_record_Report.cfm?Lab=NERL&dirEntryID=43033> (2 pages).
Brodzik et al., "Abstract: In-vehicle VOCs composition of unconditioned, newly produced cars," Journal of Environmental Sciences, vol. 26, No. 5, May 2014, retrieved on Sep. 27, 2024 from <https://www.sciencedirect.com/science/article/abs/pii/S1001074213604593> (5 pages).
You et al., "Abstract: Measurement of in-vehicle volatile organic compounds under static conditions," Journal of Environmental Sciences, vol. 19, No. 10, 2007, retrieved on Sep. 27, 2024 from <https://www.sciencedirect.com/science/article/abs/pii/S1001074207601971> (4 pages).
Grabbs et al., "Abstract: Volatile Organic Compounds in New Automobiles: Screening Assessment," Journal of Environmental Engineering, vol. 126, No. 10, retrieved on Sep. 27, 2024 from <https://ascelibrary.org/doi/abs/10.1061/%28ASCE%290733-9372%282000%29126%3A10%28974%29> (3 pages).
Yoshida et al., "Abstract: Interior Air Pollution in Automotive Cabins by Volatile Organic Compounds Diffusing from Interior Materials: I. Survey of 101 Types of Japanese Domestically Produced Cars for Private Use," Indoor and Built Environment, vol. 15, No. 5, 2006, retrieved on Sep. 27, 2024 from <https://journals.sagepub.com/doi/10.1177/1420326X06069395> (10 pages).
Becalski et al., "Abstract: Methanol exposure to car occupants from windshield washing fluid: a pilot study," Indoor Air, vol. 16, 2006, retrieved on Sep. 27, 2024 from <https://onlinelibrary.wiley.com/doi/abs/10.1111/j.1600-0668.2005.00411.x> (3 pages).
Zhang et al., "Abstract: Air pollution in the microenvironment of parked new cars," Building and Environment, vol. 43, No. 3, Mar. 2008, retrieved on Sep. 27, 2024 from <https://www.sciencedirect.com/science/article/abs/pii/S0360132306003441> (7 pages).
Yang et al., "Abstract: Emissions of volatile organic compounds from interior materials of vehicles," Building and Environment, vol. 170, Mar. 2020, retrieved on Sep. 27, 2024 from <https://www.sciencedirect.com/science/article/abs/pii/S036013231930811X> (9 pages).
Jo et al., "Abstract: Concentrations of volatile organic compounds in the passenger side and the back seat of automobiles," Journal of Exposure Science & Environmental Epidemiology, vol. 9, 1999, retrieved on Sep. 27, 2024 from <https://www.nature.com/articles/7500041> (6 pages).
Reed et al., "Abstract: New Tool Debuts for Measuring Indoor Air Pollutants," Building and Environment, vol. 46, Mar. 15, 2011, retrieved on Sep. 27, 2024 from <https://www.nist.gov/news-events/news/2011/03/new-tool-debuts-measuring-indoor-air-pollutants> (3 pages).
Chinake et al., "Abstract: Oxidation of Formaldehyde by Chlorite in Basic and Slightly Acidic Media," The Journal of Physical Chemistry A, vol. 102, No. 3, Jan. 15, 1998, retrieved on Sep. 27, 2024 from <https://pubs.acs.org/doi/pdf/10.1021/jp972884n> (4 pages).
Rav-Acha et al., "Abstract: The different reaction mechanisms by which chlorine and chlorine dioxide react with polycyclic aromatic hydrocarbons (PAH) in water," Water Research, vol. 19, No. 10, 1985, retrieved on Sep. 27, 2024 from <https://www.sciencedirect.com/science/article/abs/pii/0043135485901824> (4 pages).
Sun et al., "Abstract: Oxidative degradation of polycyclic aromatic hydrocarbons in contaminated industrial soil using chlorine dioxide," Chemical Engineering Journal, vol. 394, Aug. 15, 2020, retrieved on Sep. 27, 2024 from <https://www.sciencedirect.com/science/article/abs/pii/S1385894720308482> (10 pages).
Dalcanale et al., "First Page: Selective oxidation of aldehydes to carboxylic acids with sodium chlorite-hydrogen peroxide," The Journal of Organic Chemistry, vol. 51, No. 4, 1986, retrieved on Sep. 27, 2024 from <https://pubs.acs.org/doi/pdf/10.1021/jo00354a037> (15 pages).
Ali et al., "Abstract: Removal of polycyclic aromatic hydrocarbons from Ismailia Canal water by chlorine, chlorine dioxide and ozone,"

(56) References Cited

OTHER PUBLICATIONS

Desalination and Water Treatment, vol. 1, No. 1-3, 2009, retrieved on Sep. 27, 2024 from <https://www.tandfonline.com/doi/abs/10.5004/dwt.2009.131> (3 pages).

Rav-Acha, Ch. "Abstract: The reactions of chlorine dioxide with aquatic organic materials and their health effects," Water Research, vol. 18, No. 11, 1984, retrieved on Sep. 27, 2024 from <https://www.sciencedirect.com/science/article/abs/pii/0043135484900010> (5 pages).

Gan et al., "Abstract: Chlorite formation during ClO2 oxidation of model compounds having various functional groups and humic substances," Water Research, vol. 159, 2019, retrieved on Sep. 27, 2024 from <https://www.sciencedirect.com/science/article/abs/pii/S0043135419304002> (10 pages).

Leigh et al., "Abstract: Kinetics and mechanism of styrene epoxidation by chlorite: role of chlorine dioxide," Inorganic Chemistry, vol. 53, No. 13, 2014, retrieved on Sep. 27, 2024 from <https://pubmed.ncbi.nlm.nih.gov/24927381/> (3 pages).

OxyChem: Basic Chemicals, "Sodium Chlorite Chlorine Dioxide Treatment for Industrial & Municipal Pollutants," retrieved on Sep. 27, 2024 from <chrome-extension://efaidnbmnnnibpcajpcglclefindmkaj/https://www.oxy.com/siteassets/documents/chemicals/products/other-essentials/chlorine-dioxide-for-treatment-of-industrial-and-municipal-pollutants.pdf> (10 pages).

Zou et al., "Abstract: Study on Adsorption of Formaldehyde by Modified Activated Carbon," vol. 7, No. 2, 2016, retrieved on Sep. 27, 2024 from <https://www.semanticscholar.org/paper/Study-on-Adsorption-of-Formaldehyde-by-Modified-Zou-Meiling/040b1828f9d584ad18db6c9f393197597e49f009> (3 pages).

Hu et al., "Abstract: Characterization and adsorption capacity of potassium permanganate used to modify activated carbon filter media for indoor formaldehyde removal," Environmental Science and Pollution Research Int., vol. 25, No. 28, 2018, retrieved on Sep. 27, 2024 from <https://pubmed.ncbi.nlm.nih.gov/30091073/> (5 pages).

Wang et al., "Abstract: A highly efficient catalyst of palygorskite-supported manganese oxide for formaldehyde oxidation at ambient and low temperature: Performance, mechanism and reaction kinetics," Applied Surface Science, vol. 486, 2019, retrieved on Sep. 27, 2024 from <https://www.sciencedirect.com/science/article/abs/pii/S0169433219312759> (11 pages).

Wei et al., "Abstract: Activity of manganese oxides supported on halloysite towards the thermal catalytic oxidation of formaldehyde: Constraint from the manganese precursor," Applied Clay Science, vol. 182, 2019, retrieved on Sep. 27, 2024 from <https://www.sciencedirect.com/science/article/abs/pii/S0169131719303382> (11 pages).

Miao et al., "Abstract: Review on manganese dioxide for catalytic oxidation of airborne formaldehyde," Applied Surface Science, vol. 466, 2019, retrieved on Sep. 27, 2024 from <https://www.sciencedirect.com/science/article/abs/pii/S0169131719303382> (9 pages).

Clordisys, "Material Compatibility," retrieved on Sep. 27, 2024 from <https://www.clordisys.com/materialcompatibility.php> (2 pages).

Luftman et al., "Validation Study for the Use of Chlorine Dioxide Gas as a Decontaminant for Biological Safety Cabinets" Applied Biosafety, vol. 13, No. 4, 2008 (14 pages).

Zulauf et al., "Indoor Air Pollution in Cars: An Update on Novel Insights." International Journal of Environmental Research and Public Health, published Jul. 9, 2019 (11 pages).

IQAir, "Atem Car Air Purifier" retrieved on Aug. 29, 2024 from <https://www.iqair.com/us/products/air-purifiers/atem-car> (12 pages).

Aireox Research, "Model 22D—Purafil/Carbon" retrieved on Aug. 29, 2024 from <https://aireox.com/model-22-d> (3 pages).

United States Environmental Protection Agency, "Ozone Generators that are Sold as Air Cleaners" retrieved on Aug. 29, 2024 from <https://www.epa.gov/indoor-air-quality-iaq/ozone-generators-are-sold-air-cleanres> (11 pages).

Star brite, "NosGUARD SG Auto Odor Eliminator" retrieved on Aug. 29, 2024 from <http://www.starbrite.com/item/auto-odor-eliminator-odor-control-clo2-deoderizer?category_id=708> (2 pages).

Biocide Systems, "Auto Shocker C;O2 Odor Eliminator Quick Release" retrieved on Aug. 29, 2024 from <https://www.biocidesystems.com/products/auto-shocker-clo2-odor-eliminator-quick-release?_pos=1&_sid=d0d145754&_ss=r> (3 pages).

Taiko Pharmaceutical Co., "Chlorine Dioxide Experiment Data Library" retrieved on Apr. 27, 2020 from <https://www.seirogan.co.jp/en/research_dev/eiseidata.html> (7 pages).

Taiko Pharmaceutical Co., "Research Achievements of Taiko Pharmaceutical—ClO2 Research" retrieved on Apr. 27, 2020 from <https://www.seirogan.co.jp/en/research_dev/research/index.html> (1 page).

Taiko Pharmaceutical Co., "Cleverin Gel" retrieved on Apr. 27, 2020 from <https://www.seirogan.co.jp/en/products/eisei/cleverin_gel.html> (1 page).

Denso, "Cleverin" retrieved on Apr. 27, 2020 from <https//aftermarket.denso.com.sg/product_info/?cat_id=185> (6 pages).

Asia News, "Japan companies punished over dodgy 'antibacterial' labels" retrieved on Apr. 27, 2020 from <www.asiaone.com> (6 pages).

Taiko Pharmaceutical Co., "Business Operations" retrieved on Apr. 27, 2020 from <https://www.seirogan.co.jp/en/corporate/company/jigyou.html> (2 pages).

Taiko Pharmaceutical Co., "Cleverin G" retrieved on Apr. 27, 2020 from <https://www.seirogan.co.jp> (1 page).

Taiko Pharmaceutical Co., "Cleverin Minispray" retrieved on Apr. 27, 2020 from <https://www.seirogan.co.jp> (1 page).

Zhang et al., "Smartphone App for Residential Testing of Formaldehyde (SmART-Form)," Building and Environment 148, 2019 (12 pages).

R. G. Pinnick et al., "Fluorescence Particle Counter for Detecting Airborne Bacteria and Other Biological Particles," Aerosol Science and Technology, 23:4, 1995 (13 pages).

Liu et al., "Real-Time Measurement of Single Bacterium's Refractive Index using Optofluidic Immersion Refractometry," ScienceDirect, 2014 (5 pages).

Sumlin et al., "Retrieving the Aerosol Complex Refractive Index using PyMieScatt: A Mie Computational Package with Visualization Capabilites," Washington University in St. Louis, Missouri (24 pages).

Agranovski et al., "Real-time measurement of bacterial aerosols with the UVAPS: performance evaluation," Aerosol Science, 34, 2003 (18 pages).

Gu et al., "Discrimination of viable and dead microbial materials with Fourier transform infrared spectroscopy in 3-5 micrometers," Optics Express vol. 26, No. 12, dated Jun. 11, 2018 (9 pages).

King et al., "Assays and enumeration of bioaerosols-traditional approaches to modern practices," Aerosol Science and Technology, 2020 (24 pages).

Wyatt et al., "Aerosol particle analyzer," Applied Optics, vol. 27, No. 2, dated Jan. 15, 1988 (6 pages).

Philip J. Wyatt, "Cell Wall Thickness, Size Distribution, Refractive Index Ratio and Dry Weight Content of Living Bacteria (*Staphylococcus aureus*)," Nature, vol. 226, dated Apr. 18, 1970 (3 pages).

Rastogi et al., "Systematic Evaluation of the Efficacy of Chlorine Dioxide in Decontamination of Building Interior Surfaces Contaminated with Anthrax Spores," Applied and Environmental Microbiology, vol. 76, No. 10, dated May 2010 (9 pages).

"Test/QA Plan for Sabre Technical Services Chlorine Dioxide Gas Generator," Office of Research and Development National Homeland Security Research Center, United States Environmental Protection Agency, dated Mar. 22, 2005 (42 pages).

Lowe et al., "Impact of Chlorine Dioxide Gas Sterilization on Nosocomial Organism Viability in a Hospital Room," International Journal of Environmental Research and Public Health, published Jun. 21, 2013 (10 pages).

Mimura et al., "Preventive Effect Against Influenza-Like Illness By Low-Concentration Chlorine Dioxide Gas," accepted Jun. 30, 2010 (7 pages).

Morino et al., "Effect of low-concentration chlorine dioxide gas against bacteria and viruses on a glass surface in wet environments," Letters in Applied Microbiology, accepted Sep. 19, 2011 (7 pages).

(56) References Cited

OTHER PUBLICATIONS

Ogata et al., "Inactivation of Airborne Bacteria and Viruses Using Extremely Low Concentrations of Chlorine Dioxide Gas," Pharmacology, vol. 97, published Mar. 1, 2016 (6 pages).
"Background E. Environmental Services: Guidelines for Environmental Infection Control in Health-Care Facilities (2003)," Center for Disease Control and Prevention, retrieved on May 1, 2020 from <https://www.cdc.gov/infectioncontrol/guidelines/environmental/background/services.html> (74 pages).
Holos et al., "VOC emission rates in newly built and renovated buildings, and the influence of ventilation—a review and meta-analysis," International Journal of Ventilation, vol. 18, No. 3, published on Feb. 20, 2018 (15 pages).
Lv et al., "Experimental and simulation study on bake-out with dilution ventilation technology for building materials," Journal of the Air & Waste Management Association, vol. 66, No. 11, published on Jun. 22, 2016 (12 pages).
Kim et al., "Direct effect of chlorine dioxide, zinc chloride and chlorhexidine solution on the gaseous volatile sulfur compounds," Acta Odontologica Scandinavica Journal, vol. 72, Issue 8, published Feb. 10, 2014 (1 page).
Fedoruk et al., "Measurement of volatile organic compounds inside automobiles," Journal of Exposure Analysis and Environmental Epidemiology, vol. 13, 2003 (11 pages).
Roark et al., "Catalytic Oxidation of Volatile Organic Liquids," Journal of Environmental Engineering, vol. 130, No. 3, dated Mar. 1, 2004 (11 pages).
Shi et al., "Chlorine dioxide catalytic oxidation and online FTIR spectroscopic analysis of simulated o-chlorophenol wastewater," Research of Chemical Intermediates, vol. 38, published Feb. 19, 2012 (11 pages).
"Volatile Organic Compounds (VOCs) and Chlorine Dioxide," Odorscience, Ver. 1, dated Dec. 10, 2008 (1 page).
Paknahad et al., "Selective detection of volatile organic compounds in microfluidic gas detectors based on like dissolves like," Scientific Reports, vol. 9, No. 161, published Jan. 17, 2019 (11 pages).
Wallace, Lance A., "The Total Exposure Assessment Methodology (TEAM) Study," United States Environmental Protection Agency, EPA/600/S6-87/002, Sep. 1987 (15 pages).
"Care and Use Manual: Sep-Pak XPoSure Aldehyde Sampler," Waters Corporation, Mar. 2014 (11 pages).
"OSHA Fact Sheet: Formaldehyde," Occupational Safety and Health Administration, DSG 4/11 (2 pages).
"Indoor Air Quality in Commercial and Institutional Buildings," Occupational Safety and Health Administration, U.S. Department of Labor, OSHA 3430-04, 2011 (28 pages).
"Compendium of Methods for the Determination of Toxic Organic Compounds in Ambient Air (Second Edition)," Center for Environmental Research Information, EPA/625/R-96/010b, Jan. 1999 (56 pages).
Fuller, Demson. "Notification per Pesticide Registration Notice (PRN) 98-10 regarding Aseptrol S10-Tab," United States Environmental Protection Agency, dated Oct. 19, 2015 (7 pages).
"Compilation of Available Data on Building Decontamination Alternatives," United States Environmental Protection Agency, EPA/600/R-0-5/036, Mar. 2005 (196 pages).
Kastner et al., "Effect of pH and Temperature on the Kinetics of Odor Oxidation Using Chlorine Dioxide," Journal of the Air & Waste Management Association, vol. 53, No. 10, published Feb. 12, 2022 (8 pages).
Kastner et al., "Comparison of chemical wet scrubbers and biofiltration for control of volatile organic compounds using GC/MS techniques and kinetic analysis," Journal of Chemical Technology and Biotechnology, vol. 80, published May 4, 2005 (10 pages).
"Compatibility of Material and Electronic Equipment with Chlorine Dioxide Fumigation: Assessment and Evaluation Report," United States Environmental Protection Agency, EPA/600/R-10/038, Aug. 2010 (108 pages).
"A Study of IAQ in Automobile Cabin Interiors," Greenguard Environmental Institute, released May 31, 2006 (8 pages).
Brown et al., "Volatile Organic Compounds (VOCs) in New Car Interiors," 15th International Clean Air & Environment Conference, Nov. 26-30, 2000 (5 pages).
Faber et al., "Comparison of Air Pollution by VOCs Inside the Cabins of New Vehicles," Environment and Natural Resources Research, vol. 4, No. 3, published Jun. 8, 2014 (12 pages).
"Indoor Air Quality Hazards of New Cars," Air Quality Sciences, Inc., 2006 (8 pages).
Tokumura et al., "Car indoor air pollution by volatile organic compounds and aldehydes in Japan," AIMS Environmental Science, vol. 3, No. 3, published Jun. 21, 2016 (20 pages).
Lu et al., "Evaluation of Volatile Organic Compounds and Carbonyl Compounds Present in the Cabins of Newly Produced, Medium- and Large-Size Coaches in China," International Journal of Environmental Research and Public Health, vol. 13, No. 596, published Jun. 15, 2016 (16 pages).
Wang et al., "Predicting the emission characteristics of VOCs in a simulated vehicle cabin environment based on small-scale chamber tests: Parameter determination and validation," Environment International, vol. 142, published Jun. 7, 2020 (10 pages).
Faber et al., "Air Pollution in New Vehicles as a Result of VOC Emissions from Interior Materials," Polish Journal of Environmental Studies, vol. 22, No. 6, accepted Jun. 11, 2013 (10 pages).
Tong et al., "Modeling In-Vehicle VOCs Distribution from Cabin Interior Surfaces under Solar Radiation," Sustainability, vol. 12, No. 14, published Jul. 8, 2020 (19 pages).
Huang et al., "Removal of Indoor Volatile Organic Compounds via Photocatalytic Oxidation: A Short Review and Prospect," Molecules, vol. 21, No. 56, published Jan. 4, 2016 (20 pages).
Park et al., "Reduction of Volatile Organic Compounds Emitted from Automobile Felt by Activated Carbon and Hollow Core/Mesoporous Shell Carbon Ball," Applied Chemical Engineering, vol. 21, No. 6, Dec. 2010 (4 pages).
Bury et al., "Volatile Organic Compounds Removal from Vehicle Interior Based on Photocatalytic Solution," Journal of KONES Powertrain and Transport, vol. 25, No. 3, 2018 (8 pages).
Jo et al., "Photocatalytic destruction of VOCs for in-vehicle air cleaning," Journal of Photochemistry and Photobiology A: Chemistry, vol. 148, 2002 (11 pages).
Aoki et al., "Development of Low VOC-Emission Products and Analyses of Emitted VOCs and Aldehyde," Furukawa Review, No. 35, 2009 (8 pages).
Nunez et al., "Corona Destruction: An Innovative Control Technology for VOCs and Air Toxics," Journal of the Air & Waste Management Association, vol. 43, No. 2, Feb. 1993 (7 pages).
Chien, Yeh-Chung, "Variations in amounts and potential sources of volatile organic chemicals in new cars," Science of the Total Environment, vol. 382, Issues 2-3, Sep. 2007 (12 pages).
Faber et al., "Air quality inside passenger cars," AIMS Environmental Science, vol. 4, No. 1, published Feb. 9, 2017 (22 pages).
Zhong et al., "Chlorine Dioxide Treatment of Sisal Fibre: Surface Lignin and its Influences on Fibre Surface Characteristics and Interfacial Behavior of Sisal Fibre/Phenolic Resin Composites," BioResouces, vol. 5, No. 4, published Sep. 29, 2010 (17 pages).
Ganiev et al., "Reactions of Chlorine Dioxide with Organic Compounds," Eurasian ChemTech Journal, vol. 7, 2005 (31 pages).
Weaver-Meyers et al., "Controlling Mold on Library Materials with Chlorine Dioxide: An Eight-Year Case Study," The Journal of Academic Librarianship, Nov. 1998 (4 pages).
Applied Biosafety: Journal of the American Biological Safety Association, vol. 13, No. 4, 2008 (56 pages).
Hay et al., "The Vialibility of Photocatalysis for Air Purification," Molcules, vol. 20, published Jan. 14, 2015 (38 pages).
Tokumura et al., "Removal of acetaldehyde gas using wet scrubber coupled with photo-Fenton reaction," AIMS Environmental Science, vol. 3, No. 1, published Mar. 8, 2016 (9 pages).
Veerapandian, et al., "The Use of Zeolites for VOCs Abatement by Combining Non-Thermal Plasma, Adsorption, and/or Catalysis: A Review," Catalysts, vol. 9, No. 98, published Jan. 17, 2019 (40 pages).
Chen et al., "Self-Assembly of Novel Mesoporous Manganese Oxide Nanostructures and Their Application in Oxidative Decom-

(56) References Cited

OTHER PUBLICATIONS position of Formaldehyde," The Journal of Physical Chemistry C, vol. 111, published Nov. 15, 2007 (6 pages).
Sekine, Yoshika, "Oxidative decomposition of formaldehyde by metal oxides at room temperature," Atmospheric Environment, vol. 36, accepted Feb. 27, 2002 (5 pages).
Sorrels et al., "Chapter 1: Carbon Adsorbers," United States Environmental Protection Agency, Oct. 2018 (51 pages).
Shah et al., "A Review on Catalytic Nanomaterials for Volatile Organic Compounds VOC Removal and Their Applications for Health Buildings," Nanomaterials, vol. 9, No. 6, published Jun. 23, 2019 (23 pages).
Kastner et al., "Wet Scrubber Analysis of Volatile Organic Compound Removal in the Rendering Industry," Journal of the Air & Waste Management Association, vol. 52, No. 4, Apr. 2002 (12 pages).
Krzyzynska et al., "The importance of the location of sodium chlorite application in a multipollutant flue gas cleaning system," Journal of the Air & Waste Management Association, vol. 62, No. 6, published May 24, 2012 (11 pages).
Quan et al., "Universal and reusable virus deactivation system for respiratory protection," Scientific Reports, vol. 7, published Jan. 4, 2017 (10 pages).
Rao, Madduri V., "Acidified Sodium Chlorite (ASC): Chemical and Technical Assessment," submitted to the 68th JECFA by Ecolab Inc., USA, in the dossier dated Dec. 2006 (12 pages).
Foschino et al., "Bacterial Activity of Chlorine Dioxide against *Escherichia coli* in Water and on Hard Surfaces," Journal of Food Protection, vol. 61, No. 6, 1998 (5 pages).
Herppich et al., "Abstract: Aqueous chlorine dioxide treatment of horticultural produce: Effects on microbial safety and produce quality—A review," Critical Reviews in Food Science and Nutrition, vol. 58, No. 2, 2017, retrieved Jan. 17, 2019 from <https://www.tandfonline.com/doi/abs/10.1080/10408398.2016.1169157?journalCode=bfsn20> (6 pages).
Lowe et al., "Abstract: Evaluation of Ambulance Decontamination Using Gaseous Chlorine Dioxide," Prehospital Emergency Care, vol. 17, No. 3, retrieved Jan. 17, 2019 from <https://www.tandfonline.com/doi/abs/10.3109/10903127.2013.792889?journalCode=ipec20> (6 pages).
Llanes, Sarah, "How to Calculate the Time-Weighted Average (TWA)," The Cohen Group, retrieved on Jan. 17, 2019 from <https://www.thecohengroup.com/article/calculate-time-weighted-average-twa/> (3 pages).
Hsu et al., "Disinfection efficiency of chlorine dioxide gas in student cafeterias in Taiwan," Journal of the Air & Waste Management Association, vol. 63, No. 7, 2013 (12 pages).
Ogata et al., "Abstract: Inactivation of Airborne Bacteria and Viruses Using Extremely Low Concentrations of Chlorine Dioxide Gas," Pharmacology, vol. 97, retrieved Jan. 17, 2017 from <https://www.ncbi.nlm.nih.gov/pubmed/26926704> (2 pages).
Beuchat et al., "Abstract: Lethality of chlorine, chlorine dioxide, and a commercial fruit and vegetable sanitizer to vegetative cells and spores of Bacillus cereus and spores of Bacillus thuringiensis," Journal of Food Protection, vol. 67, No. 8, retrieved Jan. 17, 2017 from <https://www.ncbi.nlm.nih.gov/pubmed/15330537> (2 pages).
Lorcheim, Kevin, "Principles of Chlorine Dioxide Gas as a Decontamination Method," ClorDiSys, May 6, 2021, retrieved from <chrome-extension://efaidnbmnnnibpcajpcglclefindmkaj/https://www.clordisys.com/pdfs/conference/Kevin%20Lorcheim%20-%20Principles%20of%20CD%20Gas.pdf> (36 pages).
PCT/US2020/060273, "International Preliminary Report on Patentability," dated May 17, 2022 (14 pages).
Rutala et al., "Disinfectants used for environmental disinfection and new room decontamination technology," American Journal of Infection Control, vol. 41, No. 5, May 2013 (6 pages).
Wang et al., "Kinetics of Inactivation of *Bacillus subtilis* subsp. niger Spores and *Staphylococcus albus* on Paper by Chlorine Dioxide Gas in an Enclosed Space," Applied and Environmental Microbiology, vol. 82, No. 10, May 2016 (9 pages).
Selective Micro Technologies, "Technical Bulletin: GC 30," EPA Registration No. 74986-5, revised Nov. 7, 2018 (44 pages).
"ClorDiSys Workshop," ClorDiSys, Jul. 6, 2019, retrieved from <chrome-extension://efaidnbmnnnibpcajpcglclefindmkaj/https://www.clordisys.com/pdfs/ClorDiSysWorkshop.pdf> (37 pages).
Sy, Kaye V. N., "Thesis: Evaluation of Chlorine Dioxide Gas as a Sanitizer for Fresh Fruits and Vegetables," Cornell University, 2004 (127 pages).
Carrillo et al., "Application of Diluted Chlorine Dioxide to Radish and Lettuce Nurseries Insignificantly Reduced Plant Development," Ecotoxicology and Environmental Safety, vol. 35, Articile No. 0081, 1996 (10 pages).
Konjoian, Peter, "Chlorine Dioxide in Horticulture: A Technology Review," retrieved on Jan. 17, 2019 from <https://www.greenhousegrower.com/technology/equipment/chlorine-dioxide-in-horticulture-a-technology-review/> (20 pages).
Cayanan et al., "Efficacy of Chlorine in Controlling Five Common Plant Pathogens," HortScience, vol. 44, No. 1, Feb. 2009 (7 pages).
Zheng et al., "Chlorine Dioxide," School of Environmental Sciences, University of Guelph (8 pages).
Han et al., "Reduction of Listeria monocytogenes on Green Peppers (*Capscium annuum* L.) by Gaseous and Aqueous Chlorine Dioxide and Water Washing and Its Growth at 7C," Journal of Food Protection, vol. 64, No. 11, 2001 (9 pages).
Truchado et al., "Impact of chlorine dioxide disinfectation of irrigation water on the epiphytic bacterial community of baby spinach and underlying soil," PLOS One, vol. 13, No. 7, published Jul. 18, 2018 (17 pages).

\* cited by examiner

SYSTEMS AND METHODS FOR USE OF CHLORINE DIOXIDE IN CULTIVATION AND POST-HARVEST APPLICATIONS

CROSS-REFERENCE TO RELATED APPLICATIONS

This application claims the benefit of and priority to U.S. patent application Ser. No. 16/714,577, filed Dec. 13, 2019 and entitled "SYSTEMS AND METHODS FOR USE OF CHLORINE DIOXIDE IN CULTIVATION AND POST-HARVEST APPLICATIONS," which claims priority to U.S. Provisional Application No. 62/779,366, entitled "SYSTEMS AND METHODS FOR USE OF CHLORINE DIOXIDE IN CULTIVATION AND POST-HARVEST APPLICATIONS," and filed Dec. 13, 2018 and U.S. Provisional Application No. 62/799,736, entitled "SYSTEMS AND METHODS FOR USE OF CHLORINE DIOXIDE IN CULTIVATION AND POST-HARVEST APPLICATIONS," filed Jan. 31, 2019. This application also claims priority to U.S. Provisional Patent Application No. 63/051,238, which was filed on Jul. 13, 2020. The entire disclosures of the aforementioned applications are incorporated herein by reference for any purpose.

FIELD

The present disclosure relates to systems and methods for use of chlorine dioxide for treatment of microorganisms in controlled environmental agriculture settings and for post-harvest treatment of plant material.

BACKGROUND

Many pesticidal agents effective for reducing microbial populations on plants or in environments around plants can leave residues on crop products that may be harmful to downstream consumers and are prohibited under various consumer safety regulations. Chlorine dioxide is an attractive alternative to other pesticides and fungicides due to its strong oxidization capacity and broad biocidal spectrum, combined with the low rate of harmful chemical residuals from its use. Chlorine dioxide has been used to kill microorganisms such as bacteria and fungi in water, on surfaces, and in the air. Use of chlorine dioxide gas for sanitation of indoor environments is particularly attractive due to its high penetrability and good diffusivity. Chlorine dioxide is also attractive because it is rapidly dissipated by degradation into inactive and non-toxic byproducts. However, most indoor applications of chlorine dioxide are at high levels suitable to provide sterilization and generally incompatible with human, animal, or plant occupation of treated areas during treatment.

There is therefore a need for a method of controlling microorganism in a controlled environmental agriculture setting using low levels of chlorine dioxide or similar chemistries compatible with crop health and crop quality.

SUMMARY

In various aspects, a system and method of determining an effective application rate of a chemical microorganism control agent in a plant cultivation environment is provided. In various embodiments, a chemical microorganism control agent may be applied in a plant cultivation environment containing a plant crop and provide effective microorganism control while the plant crop remains substantially unaffected.

In various aspects, a system and method of applying a chemical microorganism control agent to post-harvest plant material is provided. In various embodiments, a chemical microorganism control agent may be applied to post-harvest plant material and provide effective microorganism control while the post-harvest plant material remains substantially unaffected. In various embodiments, application of an effective dose of a chemical microorganism control agent during a post-harvest treatment may be sufficient to produce a compliant plant product from a non-compliant plant product. In various embodiments, an effective post-harvest treatment may leave a plant product quality parameter substantially unaffected.

In various embodiments, a method of microorganism control in a plant cultivation environment is provided. A method of microorganism control can comprise determining a plant biomass parameter, a microorganism parameter, and a cultivation environment parameter at a first time and a first location in the plant cultivation environment. A method can further comprise determining an application rate of a chemical microorganism control agent in response to one of the plant biomass parameter, the microorganism parameter, and the cultivation environment parameter. The application rate may be calculated to produce one of an estimated effective control agent concentration and a measured effective control agent concentration. The method can comprise applying the chemical microorganism control agent in the cultivation environment at the first application rate for a first treatment period. A second microorganism parameter may be determined at a second time at the first location, and a microorganism control effect produced by applying the chemical microorganism control agent can be determined by comparing the second microorganism parameter to the first microorganism parameter. Applying the chemical microorganism control agent at the first application rate for a first treatment period may be effective to substantially prevent proliferation of a microorganism. The chemical microorganism control agent can comprise gaseous chlorine dioxide, and the effective control agent concentration may not exceed about 0.1 ppmv during the first treatment period.

A method can comprise determining a first crop parameter at the first time and a second crop parameter at a second time during or following the first treatment period. A crop effect produced by applying the chemical microorganism control agent can be determined by comparing the second crop parameter to the first crop parameter. The microorganism control agent application rate may be adjusted in response to the crop effect.

A method can comprise deploying a process challenge device. The process challenge device can comprise one of a biological indicator and a chemical indicator. A method can comprise determining the effect of applying the chemical microorganism control agent on one of a biological indicator and a chemical indicator in the process challenge device. A biological indicator can comprise any standard biological indicator known to a person of ordinary skill in the art. In various embodiments, a biological indicator can comprise a device containing microorganisms selected to provide a qualitative and/or quantitative response to a low level of gaseous chlorine dioxide that might not be sufficient to register with traditional biological indicator devices used as sterilization process challenge devices. Stated differently, a biological indicator can comprise a device configured to provide a sensitivity suitable to detect and/or measure the contact time of a very low level of gaseous chlorine dioxide.

In various embodiments, a method of microorganism control in a crop production facility is provided. A method can comprise determining a first microorganism parameter at a first time and a first location. The first microorganism parameter can be compared to an action threshold. A crop production facility parameter can also be determined. A method can comprise recommending a microorganism control protocol comprising dispensing a gaseous phase microorganism control agent at a first application rate in response to one of the first microorganism parameter, comparing the first microorganism parameter to an action threshold, and the first crop production facility parameter. A microorganism control protocol can further comprise application of the microorganism control agent as a solution phase product. The microorganism control agent can be chlorine dioxide. The crop production facility location in which the microorganism control agent is applied can house growing or harvested plant crop.

In various embodiments, a method of sanitizing an aromatic herbaceous crop material is provided. A method can comprise enclosing a crop material in a treatment chamber. A gaseous microorganism control agent is dispensed in the treatment chamber. The crop material is contacted with the gaseous microorganism control agent at a treatment level for a treatment period to produce a treated crop material. A method can further comprise determining a quantity of crop material to be treated, determining an initial microorganism level, determining a quantity of microorganism control agent to be dispensed in response to one of the quantity of crop material to be treated and the initial microorganism control level, and determining an initial concentration of a phytochemical marker. A method can further comprise determining a final microorganism level and a final concentration of the phytochemical marker for the treated crop material. The quantity of microorganism control agent dispensed may be suitable to produce a microorganism level reduction from the initial microorganism level to the final microorganism level. The method may be suitable to produce the microorganism level reduction while producing a limited change in the concentration of the phytochemical marker.

In various embodiments, a system for controlling an abundance of microorganisms in a plant cultivation environment is provided. A system can comprise a chemical microorganism control agent dispersal system, an airborne microorganism detection system, and a cultivation environment monitor system. The system can be configured to dispense an effective amount of a gaseous microorganism control agent in response to an input from the airborne microorganism detection system and the cultivation environment monitor system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 1 depicts a chemical control system for administration of a chemical microorganism control agent in a room or facility containing organic material, in accordance with various embodiments;

FIG. 2 depicts a facility having multiple rooms with separate control systems for administration of a chemical microorganism control agent, in accordance with various embodiments;

FIG. 3 depicts a process for administration of a chemical microorganism control agent in a room or facility, in accordance with various embodiments;

FIG. 4 depicts a graph of chlorine dioxide gas production over time in a controlled environmental agriculture setting under certain conditions, in accordance with various embodiments;

FIG. 5 depicts a graph of chlorine dioxide gas production over time in a controlled environmental agriculture setting under certain conditions, in accordance with various embodiments; and FIG. 6 depicts a graph of chlorine dioxide gas production over time in a controlled environmental agriculture setting under certain conditions, in accordance with various embodiments.

DETAILED DESCRIPTION

The present disclosure generally relates to treatment of a cultivation environment, crop, or harvested plant material with a chemical microorganism control agent in a manner suitable to effectively control microorganism contamination of the environment, crop, or harvested plant material, and more particularly, to treatment of an environment, crop or harvested plant material in a manner that accomplishes effective microorganism control while reducing negative impact on crop health or harvested plant material quality. While various embodiments are described herein in sufficient detail to enable those skilled in the art to practice the disclosure, it should be understood that other embodiments may be realized and that logical, procedural, or mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, a chemical microorganism control agent can comprise chlorine dioxide. Chlorine dioxide may be deployed as a solution, a gas, a solid, or a combination thereof. A chemical microorganism control agent can comprise any chemical agent suitable to kill, destroy, control, or prevent the growth of a microorganism.

In various embodiments, a microorganism control method may substantially prevent proliferation of fungal microorganisms without the use of a fungicide, such as any of the fungicides listed in FRAC Code List 2018 (http://www.phibase.org/images/fracCodeList.pdf), which reference is incorporated herein in its entirety.

In various embodiments, a system and method of determining an effective application rate of a chemical microorganism control agent can comprise determining a treatment environment parameter. In various embodiments, a system and method of determining an effective application rate of a chemical microorganism control agent in a plant cultivation environment can comprise determining at least one of: a cultivation facility configuration, a cultivation room configuration, a cultivation facility room use, a cultivation facility HVAC system configuration, a cultivation facility environmental condition parameter, a chemical interaction parameter (i.e., a chemical interaction with other chemical agents that may be deployed in a cultivation facility or treated room), a microorganism parameter, such as an environmental microorganism load and a plant biomass microorganism load, a plant biomass parameter such as a plant biomass load, meteorological parameters, human activity/presence parameters, and the like.

A microorganism parameter can comprise any measurable microorganism-related variable in an environment to be treated. For example, determining a microorganism parameter can comprise determining a microorganism type, a microorganism density, a microorganism development stage, a microorganism pathogenesis stage, and related factors. In an environment comprising plants to be treated in situ, a microorganism parameter can comprise a plant biomass microorganism load. A plant biomass microorganism load can comprise microorganisms located on the surfaces of plant tissue, within plant tissues, or associated with containers, media and the like associated with plants in cultivation. A microorganism parameter can comprise an environmental microorganism load. Environmental microorganism load may be determined by standard methods of environmental microbiologic sampling, for example, by monitoring or measuring a presence of microorganisms in the air or on surfaces in an environment using techniques such as passive air monitoring, active air monitoring, and surface sampling methods. Active air sampling can include methods such liquid impingement, impaction, filtration, centrifugation, electrostatic precipitation, thermal precipitation, and the like. Microbial detection may be performed using direct methods such as microbial culture and enumeration techniques, or indirect methods such as measurement of adenosine triphosphate (ATP), nicotinamide adenine dinucleotide (NAD), or residual protein or nucleic acid techniques.

For example, a plant biomass parameter can comprise a plant species or genotype, a plant number, a total plant aboveground biomass, a total plant aboveground surface area, a total leaf surface area, a crop leaf morphology, a crop developmental stage, a leaf or flower trichome density and/or trichome type, a crop water stress condition, a crop photosynthesis rate, a crop carbon dioxide assimilation rate, a crop spectral reflectance, or a crop attribute temporal change (e.g., growth rate or dynamic changes in other measured states such as spectral states). A plant biomass parameter can be assessed using any suitable means now known or devices in the future, including manual measurement and estimation as well as any of a variety of remote and proximal sensing and precision agriculture technologies in development. See, for example, Katsoulas et al., 2016, *Crop reflectance monitoring as a tool for water stress detection in greenhouses: A review*, Biosys. Eng. 151: 374-398, the entirety of which is incorporated herein by references for any purpose.

A cultivation facility environmental condition parameter can comprise any measurable environmental condition in a controlled environmental agriculture facility, including relative humidity, airflow level, airflow pattern, light cycle, light intensity, light wavelength, temperature cycle, and the like, along with dynamic changes or patterns of dynamic changes of any such variable.

A cultivation room configuration parameter can comprise information or data regarding room layout, construction materials, furnishings and furnishing materials, surface areas of various material types, surface porosity, and so forth.

In various embodiments, a system and/or method can comprise determining a plurality of the above-listed factors and accounting for each in development of an effective, room or facility-level chemical microorganism control agent application system and method. The above listed factors may be assessed in determining a state of a room, building, or any other type of facility. An autoencoder or other generative artificial neural net (GANN) may also select factors to yield a compact representation of the state space with an appropriate predictive capacity for controlling microbial density.

Figure 1:
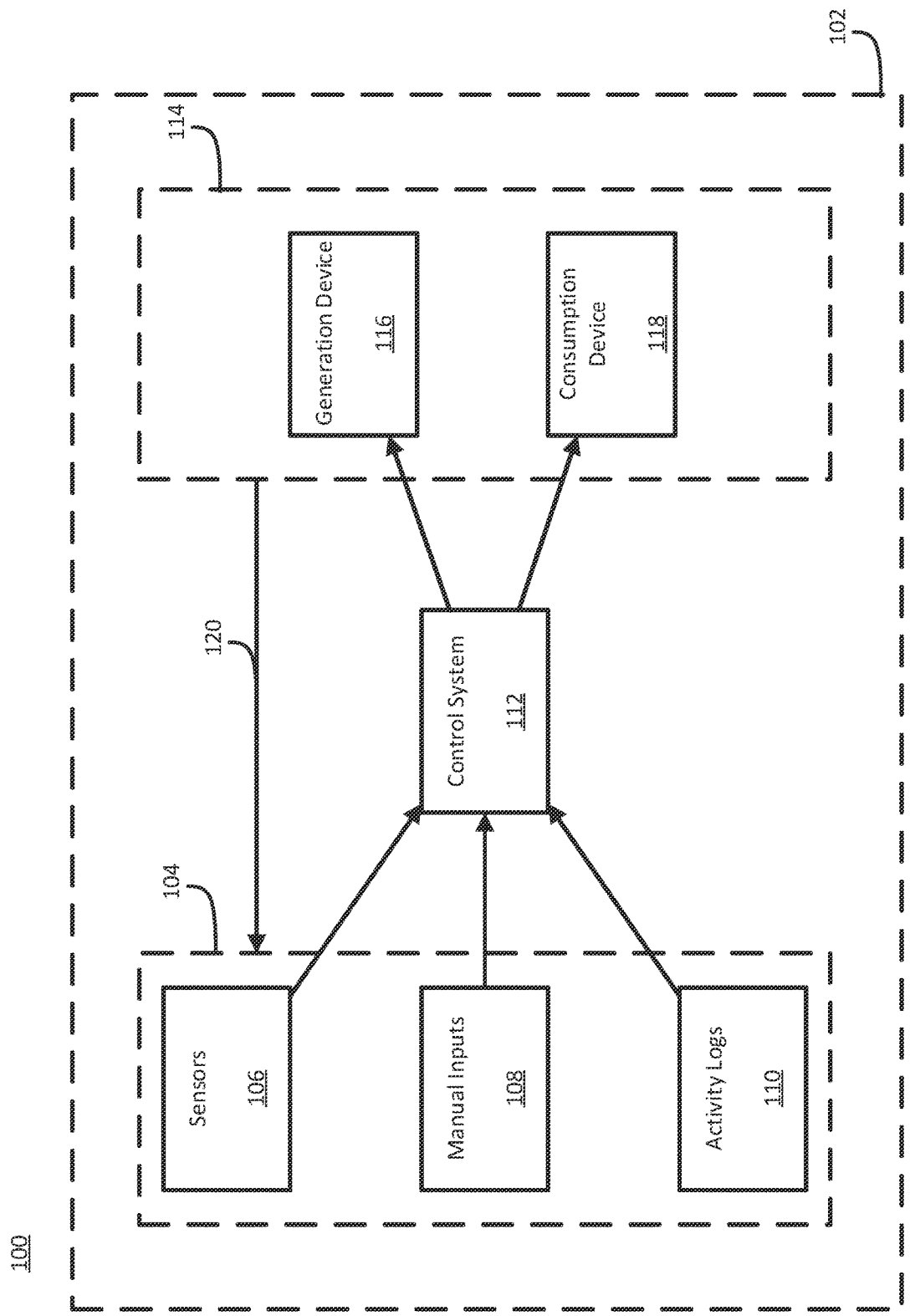

Referring now to FIG. 1, environmental control system (ECS) 100 is shown for administering a microorganism control agent in facility 102 containing organic material, in accordance with various embodiments. Facility 102 may be a single room, a combination of rooms, a building, a warehouse, a greenhouse, a temperature-controlled area, or another volume suitable for growing or storing organic material.

In various embodiments, ECS 100 may use reinforcement learning, supervised learning, semi-supervised learning, dynamic programming or other machine learning approaches in a plant cultivation or storage environment. The foregoing techniques may be used in the absence of a dynamics model, while a GANN may be used to estimate transition probability densities for a dynamics model in the case of dynamic programming and/or planning. For example, ECS 100 may use a highly-parametrized Markov Decision Process (MDP model) to model responses to measured state 104 of facility 102 relating to environmental, plant product quality, microorganism, and/or biomass parameters. ECS 100 may regulate the environmental parameters in facility 102 by generating ClO2 in the plant cultivation facility.

In various embodiments, ECS 100 may comprise an agent taking actions that affect the state 104 of plant health, environmental, microorganism, plant product quality, biomass, or other parameters of the facility 102. ECS 100 may assess potential actions by considering previous actions taken to change state 104 and the reward derived from the previous actions taken. ECS 100 may comprise a state-action space with members being a vector of parameters indicative of state 104 and actions 114 taken in facility 102. The state-action space may enable ECS 100 to select an action 114 to take in furtherance of controlling microbial levels in facility 102.

In various embodiments, ECS 100 may comprise process challenge devices and sensors and a delivery system, which may be specific to a facility 102 (e.g., a single plant cultivation environment, room, or bay). The agent may have visibility into some A observations of the aforementioned parameters prior to the current time, t, which is referred to as it's state: $S_t = O_t, O_{t-1}, \ldots, O_{t-(\lambda-1)}$ where $S_t \subset H_t$. The model may satisfy the Markov Assumption $P(S_{t+1}|S_t, A_t) = P(S_{t+1}|H_t, A_t)$. The Markov Assumption implies that the future is independent of the past given the present given the right aggregate statistic (state 104).

In various embodiments, ECS 100 may make good predictions about the distributions of future states without considering the entire history of actions and observations at each step. ECS 100 may consider current state 104. ECS 100 may thus predict the incidence of stochastic events happening in real-time and act appropriately to mitigate harm inflicted on plant health parameters by microorganisms in facility 102.

In various embodiments, ECS 100 using an MDP model may comprise tuple of a set of states, a set of actions, a dynamics model for each action, a reward function of actions and states, a discount factor, and a policy, expressed as (S, A, P, R, γ, π), respectively. A method of approximating the value of a particular state-action pair under a particular policy may be useful when the state space is large. Instead of defining a dynamics model, P, ECS 100 may comprise samples of the real-life Markov process that the model approximates to empirically and implicitly estimate P.

In various embodiments, the MDP of ECS 100 may comprise a state space, S, an action space, A, and a combined state-action space, N. S and A may also be linear subspaces of N (i.e., $\dim_R(N) = \dim_R(S) + \dim_R(A)$). N may also be defined as the concatenation of S and A. The state space may comprise M parameters including environmental, plant product quality, microorganism, biomass parameters, or other parameters indicative of the state 104 in facility 102. Each vector in the state space contains 'm' parameters (i.e., s' ∈ S, where S ⊂ $R^m$).

A particular state s' may be a unique combination of those parameters. A state may be represented, for example, as a vector or combination of values with each dimension or value representing an assessment of a parameter or combination of parameters.

The state space, S, may comprise the collection of unique combinations of the M parameters that define an individual state. The domains for each variable may be discretized, and given upper and lower bounds, to make the state space finite and facilitate operation of ECS 100. Then if each variable $x_m$ for m ∈ [1, M] has $k_m$ discreet values, and the size of the state space, n is $n = \Pi_{m=1}^{M} k_m$.

In various embodiments, state space, S, may be expressed as an n by m matrix and includes possible values describing state 104 of facility 102. A particular state s' in the state space S may be comprised of values for one or more of the parameters listed in table 1, for example. Domains and variables included in table 1 are offered as examples and are not intended to be limiting. Continuous variables may have domains discretized into 'bins' to reduce the size of the state space, and the domains may be mapped onto numeric ranges suitable for assessing state.

TABLE 1

Example state space parameters and example domains for parameter value.

| Parameter | Parameter Type | Domain |
|---|---|---|
| microorganism type | Microorganism Parameter | [asp./pen, botrytis, oidium, basidiospores, ascospores, fusarium, PM, root infecting pathogen, TYM, mycotoxins, salmonella, etc] |
| microorganism density | Microorganism Parameter | |
| microorganism development stage | Microorganism Parameter | |
| microorganism pathogenesis stage | Microorganism Parameter | |
| microorganism count (on plant surface) | Plant Biomass Parameter | [0, 20,000/m^3] |
| microorganism count (in plant's tissues) | Plant Biomass Parameter | [0, 20,000/m^3] |
| microorganism count (in plant material container) | Plant Biomass Parameter | [0, 20,000/m^3] |
| plant species | Plant Biomass Parameter | [cannabis, hemp, berries, etc] |
| plant genotype | Plant Biomass Parameter | [Sour Diesel, Jack Herer, GDP, etc] |
| plant phenotype | Plant Biomass Parameter | [sativa, indica, etc] |
| plant number | Plant Biomass Parameter | [1, 10,000] |
| total plant aboveground mass | Plant Biomass Parameter | [0 kg, 1,000,000 kg] |
| total plant aboveground surface area | Plant Biomass Parameter | [0, 100 acres] |
| total leaf surface area | Plant Biomass Parameter | [0, 500 m^2 |
| crop leaf morphology | Plant Biomass Parameter | |
| crop developmental stage | Plant Biomass Parameter | |
| leaf or flower trichome density | Plant Biomass Parameter | |
| leaf or flower trichome type | Plant Biomass Parameter | |
| crop water stress condition | Plant Biomass Parameter | |
| crop photosynthesis rate | Plant Biomass Parameter | |
| crop CO2 assimilation rate | Plant Biomass Parameter | |
| visible plant discoloration | Plant Biomass Parameter | [0, 5] |
| crop spectral reflectance | Plant Biomass Parameter | |
| temporal change in any crop parameter | Plant Biomass Parameter | [−300%, 300%] |
| airborn mold spore count (total) | Environmental Microorganism Parameter | [0, 2,000,000] |
| airborn mold spore count (individual genera of mold) | Environmental Microorganism Parameter | [0, 100,000] |
| surface mold spore count (total) | Environmental Microorganism Parameter | [0, 2,000,000] |
| surface mold spore count (individual genera of mold) | Environmental Microorganism Parameter | [0, 100,000] |
| measurement of ATP | Environmental Microorganism Parameter | |
| measurement of NAD | Environmental Microorganism Parameter | |

TABLE 1-continued

Example state space parameters and example domains for parameter value.

| Parameter | Parameter Type | Domain |
|---|---|---|
| grow type | Cultivation Facility Configuration Parameter | indoor, greenhouse, hoop house |
| location density | Cultivation Facility Configuration Parameter | urban, rural, suburban |
| number of neighboring agricultural sites (<1 mi away) | Cultivation Facility Configuration Parameter | [0, 20] |
| building age | Cultivation Facility Configuration Parameter | [0, 200 years] |
| zip code | Cultivation Facility Configuration Parameter | [00000, 99999] |
| Room Type | Cultivation Room Configuration Parameter | dry, trim, mother, etc |
| room Sqft | Cultivation Room Configuration Parameter | [0, 1,000,000] |
| room Cuft | Cultivation Room Configuration Parameter | [0, 25,000,000] |
| grow media | Cultivation Room Configuration Parameter | cocoa, soil, etc |
| isolated HVAC? | Cultivation Room Configuration Parameter | true false |
| grow week | Cultivation Room Use Parameter | [0, 10] |
| harvest type | Cultivation Room Use Parameter | full, perpetual |
| indoor temperature | Cultivation Facility Environmental Condition Parameter | [0, 110 degrees F.] |
| indoor RH | Cultivation Facility Environmental Condition Parameter | [0%, 100%] |
| indoor VPD | Cultivation Facility Environmental Condition Parameter | [−1, 12] unitless |
| indoor CO2 | Cultivation Facility Environmental Condition Parameter | [0, 5000 ppm] |
| hourly temp change | Cultivation Facility Environmental Condition Parameter | [−50, 50] |
| hourly RH change | Cultivation Facility Environmental Condition Parameter | [−100%, 100%] |
| indoor dewpoint | Cultivation Facility Environmental Condition Parameter | [0, 100° F.] |
| Water Activity | Cultivation Facility Environmental Condition Parameter | [0, 1] |
| indoor air pressure | Cultivation Facility Environmental Condition Parameter | |
| extended-release replacement countdown | Cultivation Facility Environmental Condition Parameter | [0, 30] |
| HVAC Mode | Cultivation Facility Environmental Condition Parameter | [on, off, circulate, etc] |
| greenhouse status | Cultivation Facility Environmental Condition Parameter | [0%, 100%] |
| outside temperature | Meteorological Parameter | [−30, 125 degrees F.] |
| outside RH | Meteorological Parameter | [0%, 100%] |
| outside VPD | Meteorological Parameter | [−1, 12] unitless |
| outside CO2 | Meteorological Parameter | [0, 5000 ppm] |
| sun intensity | Meteorological Parameter | [μ moles of photons/(m2)(s)] |
| precipitation | Meteorological Parameter | [0, 100 inches] |
| precipiation type | Meteorological Parameter | [rain, snow, sleet, hail, etc] |
| air pressure | Meteorological Parameter | |
| wind speed | Meteorological Parameter | [0, 100 mpg] |
| wind direction | Meteorological Parameter | [0, 360 degrees] |
| hourly temperature delta (outside) | Meteorological Parameter | [−50, 50] |
| outside airpressure | Meteorological Parameter | |
| activity log | Human Activity Parameter | [0, 20 people] |
| indoor presence of light | Human Activity Parameter | [True, False] |
| under PEL | Human Activity Parameter | [True, False] |
| pruning currently | Human Activity Parameter | [True, False] |
| watering currently | Human Activity Parameter | [True, False] |
| harvesting currently | Human Activity Parameter | [True, False] |
| sweeping currently | Human Activity Parameter | [True, False] |
| planting currently | Human Activity Parameter | [True, False] |
| cleaning currently | Human Activity Parameter | [True, False] |
| Hydrogen Peroxide currently | Chemical Interaction Parameter | [True, False] |
| Peracetic Acid currently | Chemical Interaction Parameter | [True, False] |
| Ozone currently | Chemical Interaction Parameter | [True, False] |
| maximum observed gaseous ClO2 concentration | Chemical Interaction Parameter | [0, 5 ppm] |
| predicted maximum gaseous ClO2 concentration | Chemical Interaction Parameter | [0, 5 ppm] |

In various embodiments, the action space may comprise a similar set of parameters to the state space, but the parameters in the action space may represent encodings of the action available to ECS 100 at a particular time. Available actions in the action space may comprise, for example, delivering a volume of quick-release ClO2, delivering a volume of slow-release ClO2, or consuming ClO2, for example. The action space may comprise all actions that ECS 100 running an agent may take to modify the state of observable environmental, plant health, microorganism or other parameters. Table 2 includes an example of a potential action space.

The action space, A, may comprise the collection of unique combinations of the Z parameters that define an encoding of one observation from the action space. The domains for each action may be discretized and given upper and lower bounds where applicable to make the action space finite and facilitate operation of ECS 100. Then if each variable $x_z$ for $z \in [1, Z]$ has $k_z$ discreet values, and the size of the action space, v is $v=\Pi_{z=1}^{Z} k_z$. A particular a in A may be expressed as a one-hot vector or in another suitable encoding.

In various embodiments, the action space, A, may be expressed as a v by z matrix and includes possible values describing action 114 in a room or facility 102. A particular action, a', in the action space, A, may be comprised of values for one or more of the parameters listed in table 2, for example. Domains and actions included in table 2 are offered as examples and are not intended to be limiting. Actions with continuous domains may have their domains discretized into 'bins' to reduce the size of the action space and the domains may be mapped onto numeric ranges suitable for encoding actions.

TABLE 2

Example action in an action space and example domains for the actions.

| Action Name | Action Domain |
| --- | --- |
| Dispense Gaseous ClO2 | [0 ppmv/hr, 6 ppmv/hr] |
| Replace Extended-Release ClO2 | [0, 200] |
| No Action | true, false |
| Apply liquid ClO2 | [0 ppm, 500 ppm] |
| Cleaning Alert | true, false |
| open greenhouse | [0%, 100%] |
| Reduce RH | [0%, 100%] |
| Increase RH | [0%, 100%] |
| Increase Temperature | [0, 100] |
| Decrease Temperature | [0, 100] |
| Adjust HVAC | circulate, vent, isolate |
| Adjust Artificial Light | [0, 100] |
| Adjust Natural Light | [0, 100] |

In various embodiments, S and A may comprise linear subspaces of N such that a particular feature map from N, x(s, a) is a concatenation of a particular s in S and a in A. Stated another way, actions 114 may send feedback 120 to state 104 read by ECS 100 for use in conjunction with a combined state-action space with the action parameters sent in feedback 120 used as a parameter in the state-action space. The combined state-action space may thus be a 'concatenation' of both action and state spaces. N may be expressed as a (nv) by (m+z) matrix and includes possible feature maps of the combined state-action space in a room or facility 102. N may be used to create a feature map, x (s, a), which may represent a state-action pair as a vector of N's feature variables and may be used to estimate a value function to evaluate the value of state-action pair under an arbitrary but fixed policy.

In various embodiments, a reward function of the state and action may be defined as r $(s_t, a_t)$, and r may be modeled as some function, a, of a vector of parameters, $\Omega$, where $\Omega$ is a linear subspace of N, from the plant cultivation environment such that r $(s_t, a_t)=\sigma(\Omega_t)$. $\sigma(\Omega_t)$ may be calculated as follows: $\sigma(\Omega\_t)=\sigma(d\_t(e\_t, o\_t)$ where $e_t \in \Omega_t$ is the expected or predicted maximum gaseous ClO2 concentration in time t, and $o_t \in \Omega_t$ is the observed maximum gaseous ClO2 concentration in time t. Then $d_t=e_t-o_t$. Then for some $l \in R$ and some $-l \in R$:

$$\sigma(d_t) = \begin{cases} \frac{-d_t}{RD(d_t)} & \text{for } d_t > l \\ 1 & \text{for } -l \leq d_t \leq l \\ \frac{d_t}{RD(d_t)} & \text{for } d_t < -l \end{cases}$$

The MDP of ECS 100 may be tuned using Bellman backups to choose the action that maximizes the expected reward i.e., a mapping from params from the state and action spaces to some predetermined measure of efficacy, $\Omega$, such as, for example, plant health parameter, plant product quality parameter, etc. $\Omega$ will likely be comprised of plant health parameters, microorganism parameters, and plant product quality parameters as well as the entirety of the action space parameters.

In various embodiments, ECS 100 may use a reinforcement learning model to improve future selection of actions given a state. ECS 100 may improve the reinforcement learning model over time by evaluating a fixed policy, $\pi$, using an approximation, $\hat{Q}^\pi(s, a; w)$, of the true value function, $Q^\pi(s, a)$. ECS 100 may also improve the policy using an e-greedy approach with respect to $Q^\pi(s, a)$ and thereby selecting an unexplored action occasionally to inject stochasticity and improve the model. ECS 100 may use various methods of estimating the true value function, $Q^\pi(s, a)^*$: in applying reinforced learning to the MDP of ECS 100. For example, ECS may use Monte Carlo, Temporal Difference/Q-learning (with actor-critic architecture), or other generalized policy improvement algorithm variant known or developed in the future.

In various embodiments, ECS 100 may use a parametrized estimate of the value of a state-action pair, $\hat{Q}^\pi(s, a; w)$, in response to the state space being large, which tends to prevent each state from occurring frequently enough to satisfy the assumptions necessary to converge. ECS 100 may thus approximate the value function, $\hat{Q}^\pi(s, a; w)$, using approximation techniques such as, for example, linear VFA, a deep convolutional neural network (DCQN), a decision tree, random forest, SVM, ANN, ridge regression, LASSO regression or any other supervised or semi-supervised machine learning method. ECS 100 may estimate the value of a new state-action pair, (s', a'), which is similar to a previous state-action pair (s,a) using an estimate of the value of being in state s and taking action a. The estimate of the value of being in state s and taking action a may be parametrized by a vector of feature weights, w.

In various embodiments and by way of an example defining a new set, N=SΛA, where actions are encoded as observations of features of the state, x (s, a): $N \to R^{(m+z)}$ may be a feature map of the combined state-action space, N, where $(m+z)=\dim_R(N)$. N represents a snapshot of the plant health, environmental, biomass, or other parameters in facility 102 at a moment in time. The snapshot may include an encoding of the action that is being taken at that time step (e.g., amount of ClO2 dispensed could be a feature in x (s, a)). A value of a state-action pair under policy π may be defined by taking the dot product of our feature representation of that state-action pair and our current vector of feature weights, w, $\hat{Q}^\pi(s, a; w) = x(s, a)^T w$.

In various embodiments, ECS 100 may use the Monte Carlo method to estimate the state-action value function. The Monte Carlo method may average returns from sample trajectories from the real world MDP to estimate the state-action value function. The Monte Carlo method may be used without a transition model, but the process may be episodic and repeatable. ECS 100 may define episodes as time intervals (minutes, an hour, 12 hours, a day, week, month, etc.), define an episode as a predetermined number of time steps, or define terminal states that end episodes. ECS 100 may also perform stochastic gradient descent (SGD) to find the value of w that minimizes our objective function.

$$\arg\min_w \; J(w) = \mathbb{E}\left(\left[Q^\pi(s,a) - \hat{Q}^\pi(s,a;w)\right]^2\right)$$

In various embodiments, ECS 100 may estimate the value of $Q^\pi(s, a)$, by sampling a trajectory or 'episode' (episodes may terminate for Montel Carlo), and setting $Q^\pi(s, a) = G_t(s, a)$, where $G_t(s, a)$ is the discounted sum of observed returns from the rest of the episode, starting at time t from state s, taking action a, and using $\gamma \in [0,1]$ as the discount factor.

In various embodiments, since $\hat{Q}^\pi(s, a; w) = x(s, a)^T w$, ECS 100 may use $$\arg\min_w \; J(w) = \mathbb{E}\left(\left[G_t(s,a) - x(s,a)^T w\right]^2\right)$$

as the objective function, where the expectation is over the distribution of state-action pairs encountered in a trajectory following policy π. ECS 100 may update the weight vector, $w = w - \Delta w$, at the end of each episode. An update, $\Delta w$, can be expressed:

$$\Delta w = \alpha \cdot (Q^\pi(s,a) - \hat{Q}^\pi(s,a;w)) \cdot \nabla_w \hat{Q}^\pi(s,a;w)$$

$$\Delta w = \alpha \cdot (G_t(s,a) - r(s,a)^T w) \cdot r(s,a)$$

In various embodiments, ECS 100 may improve its policy by implementing an ε-greedy policy, π, with respect to a state-action value $Q^\pi(s, a)$. An ε-greedy policy may, with some probability, (1−ε), result in ECS 100 selecting the best action that we have a value for (exploiting knowledge of 'known' actions to choose a good one), while with ε probability we will take an action $a \neq \pi(s)$ with probability of ε over the cardinality of the action space A (exploring 'new' actions).

$$\pi(a \mid s) = \begin{cases} \arg\max_a \{q^T(s,a)\} & \text{with prob } (1-\epsilon) \\ a & \text{with prob } \frac{\epsilon}{|A|} \end{cases}$$

ECS 100 may be programmed with or choose a π that is ε-greedy with respect to $Q^\pi(s, a)$ and may ε as a function of time in the interest of convergence.

In various embodiments, finding the optimal value of w as above may be analogous to performing linear regression to fit w to x(s, a) to minimize the prediction error of the value of a state-action value. The same process may be used where instead of w representing a vector of a feature weights derived using a linear model, w can be a vector of features weights derived from a composition of non-linear, differentiable functions. Then using the chain rule, ECS 100 may perform SGD to back-propagate the gradients of that composition of functions. This composition of functions can take the form of a deep convolutional neural network or any other type of neural network. Convolution layers may be used to reduce the dimensionality of the feature space by extracting higher-level features from the feature mapping to states and actions (x(s, a)). Pooling layers may group similar feature representations based on the convolutions in the previous layer. Pooled feature representations may be fed into fully-connected layers down-stream which output a vector of feature weights.

In various embodiments, ECS 100 may use the Temporal Difference method to estimate the state-action value function. Temporal Difference methods may sample the real-life Markov Process to estimate the transition probabilities of the system, while bootstrapping and using an existing parametrized approximation of the state-action value function to estimate the value of a particular state-action pair under a particular policy. Temporal difference may be used without a dynamics model, and the MDP may be modeled as episodic or non-episodic.

In various embodiments, Temporal Difference modeling may comprise an actor-critic model maintaining two separate feature weight vectors, w and $w^-$. $w^-$ may be used to estimate the value of the Temporal Difference target, $\hat{Q}_\pi(s, a; w^-)$, while w is used to estimate the value of a state-action pair under a policy, $\hat{Q}_\pi(s, a; w^-)$. In that regard, Temporal Difference may use a stationary target to optimize w towards, thereby improving policy stability and increasing the probability of convergence.

In various embodiments, Temporal Difference may employ a data buffer to store past 'experience tuples' sampled from the MDP. ECS 100 may periodically reevaluate the experiences stored in the buffer to back-propagate information gained in subsequent samples/iterations. The reevaluation of experiences tends to cause the value function of ECS 100 to converge with a smaller sample of the transition dynamics from the real-life Markov Process and with lower variance.

In various embodiments, ECS 100 may perform SGD to find the value of w that minimizes our objective function. For Temporal Difference, the objective function may be represented as $$Q^\pi(s,a) = r + \gamma \max_a \hat{Q}^\pi(s',a';w^-)$$

where $w^-$ is a separate set of feature weights used to compute the value of the target, while w is used to compute the value of the state-action pair under the policy. The objective function, $r + \gamma \max_a \hat{Q}^\pi(s', a'; w^-)$ may bootstrap using the prior estimate of the state-value pair, $\hat{Q}^\pi(s'a'; w^-)$, instead of sampling the true returns from the entire process.

In various embodiments, ECS using Temporal Difference may solve for $$\arg\min_w \; J(w) = \mathbb{E}\left(\left[r + \gamma \max_a \; x(s',a')^T w'' - x(s,a)^T w\right]^2\right)$$

over the distribution of state-action pairs encountered in a trajectory following policy π. ECS 100 may then update our weight vector, $w = w - \Delta w$. ECS 100 may retain an experience buffer, D, which will hold j (s,a,r,s') tuples. After a predetermined threshold of j updates, ECS 100 may stop sampling new tuples from the MDP for j steps, and reevaluate each of the tuples in the replay buffer using the current estimate of w⁻ to update w. After each of the tuples in D is reevaluated, we set w⁻=w.

An update, $\Delta w$, can be expressed as:

$$\Delta w = \alpha \cdot \left( r + \gamma \max_{a} \hat{Q}^{\pi}(s', a'; w'') - \hat{Q}^{\pi}(s, a; w) \right) \cdot \nabla_w \hat{Q}^{\pi}(s, a; w)$$

$$\Delta w = \alpha \cdot \left( r + \gamma \max_{a} x(s', a')^T w'' - x(s, a)^T w \right) \cdot x(s, a)$$

ECS 100 may also implement an ε-greedy policy with respect to a state-action value $Q^{\pi}(s, a)$ in the manner described above in reference to the Monte Carlo method. Finding the optimal value of w as above may be analogous to performing linear regression to fit w to x(s, a) to minimize the prediction error of the value of a state-action value.

With continuing reference to FIG. 1 an in accordance with various embodiments, facility 102 may comprise a sensor 106 (or an array of sensors 106) deployed throughout to detect environmental condition throughout facility 102. Sensors 106 may be configured to measure and return information regarding parameters from the combined state-action space present in facility 102. For example, sensor 106 may comprise a temperature sensor, a photosynthetically active radiation sensor, a relative humidity sensor, a carbon dioxide sensor, an air movement sensor, a chemical microorganism control agent sensor, and any other environmental condition sensor presently known or developed in the future to assess treatment environment parameters. In various embodiments, sensor 106 may comprise a spore trap configured to take air samples and enable determination of the presence of airborne microorganisms (including microorganism spores). In various embodiments, sensor 106 may comprise a particle counter configured to count and/or identify airborne microorganisms in facility 102.

In various embodiments, ECS 100 may also accept manual inputs 108, in accordance with various embodiments. Manual inputs may comprise data captured, entered, or uploaded using a keyboard, touchscreen, camera, microphone, measuring tool, Internet of Things (IoT) device, manual spore trap, manually collected parameter data, or a human interface in electronic communication with control system 112.

In various embodiments, state 104 data may also be collected from activity logs 110 generated by electronic devices around facility 102. Activity logs 110 may include, for example, ingress or egress logs from doors or badge readers, logs from generation or consumption of the microorganism control agent, logs of network activity, logs from sensors 106, or any other log relevant to assessing the state of facility 102.

In various embodiments, control system 112 may read state 104 data from sensors 106, manual inputs 108, and/or activity logs 110 to assess the state 104 of facility 102. State 104 data may be compared to a state space evaluated by control system 112 to determine the state of facility 102.

In various embodiments, control system 112 may select an action 114 based on the state 104 in facility 102. Action 114 may comprise increasing or decreasing chlorine dioxide concentrations by activating or adjusting generation device 116 and/or consumption device 118. Generation device 116 may introduce chlorine dioxide into the environment of facility 102 at a rate controlled by control system 112. Generation device 116 may off gas liquid chlorine dioxide of known concentrations to disperse accurate amounts of ClO2 (i.e., aeration of ClO2 containing liquid).

In various embodiments, generation device 116 may administer a chemical microorganism control agent (e.g., chlorine dioxide) generated in an area to be treated. Generation device 116 may, for example, activate a product comprising a chemical composition in a solid matrix configured to produce gaseous chlorine dioxide when exposed to liquid water or moisture in the ambient air. For example, ProKure® G Fast Release Gas, ProKure® D Extended Release Gas, or ProKure® V Liquid products (ProKure® Solutions, Phoenix, AZ) may be used to generate chlorine dioxide in accordance with various embodiments described herein. The ProKure® G Fast Release Gas product may be used to rapidly generate chlorine dioxide gas in an area to be treated. Gas generation is initiated by inserting the product into about 100 ml of water, and about 1000 mg of chlorine dioxide is produced within about 60 minutes of initiation. The chlorine dioxide gas is generated within the pouch and passively escapes the pouch and is distributed by air distribution and/or equilibration in the surrounding area over about a 120-minute time period. The ProKure® D Extended Release Gas product may be used to generate a low level of chlorine dioxide gas over an extended time period, such for up to about 30 days. Generation of chlorine dioxide gas using the ProKure® D product is dependent on the amount of water available in the air surrounding the pouch. A higher relative humidity (RH) level in the air in which the product is deployed increases the rate of chlorine dioxide gas generation, and a lower RH produces a lower rate of gas generation. An average rate of release of chlorine dioxide for a ProKure D product deployed in an environment with a RH ranging from 40 to 90% is about 3 mg of chlorine dioxide per hour. Similar to the ProKure G product, chlorine dioxide gas generated by the ProKure D product passively escapes the product pouch and is dispersed by air distribution and equilibration in the environment in which the product is deployed.

In various embodiments, consumption device 118 may remove chlorine dioxide from the environment in facility 102 at a rate controlled by control system 112. Consumption device 118 may comprise dilution with fresh air or non-chlorine-dioxide air using HVAC systems or other suitable air handling devices to control ventilation or supply air. Consumption device 118 may comprise carbon filters may to trap chlorine-dioxide molecules. Consumption device 118 may also comprise light control devices to decompose chlorine dioxide concentration in the air such as, for example, artificial lighting switches or dimmers, automated window or skylight coverings, panel articulation devices, or other devices suitable to control air flow or light exposure. Control system 112 may thus maintain suitable chlorine dioxide levels in facility 102 for plant growth, plant storage, and/or human presence using generation devices 116 and/or consumption devices 118.

In various embodiments, action 114 may comprise adjusting adaptable environmental inputs such as, for example, opening or closing a window, vent, door, or other barrier to control microbial growth in facility 102. Action 114 may also include adjusting light levels, heat levels, humidity levels, pressure levels, or other adaptable parameters in facility 102 to control microbial growth in facility 102.

Figure 2:
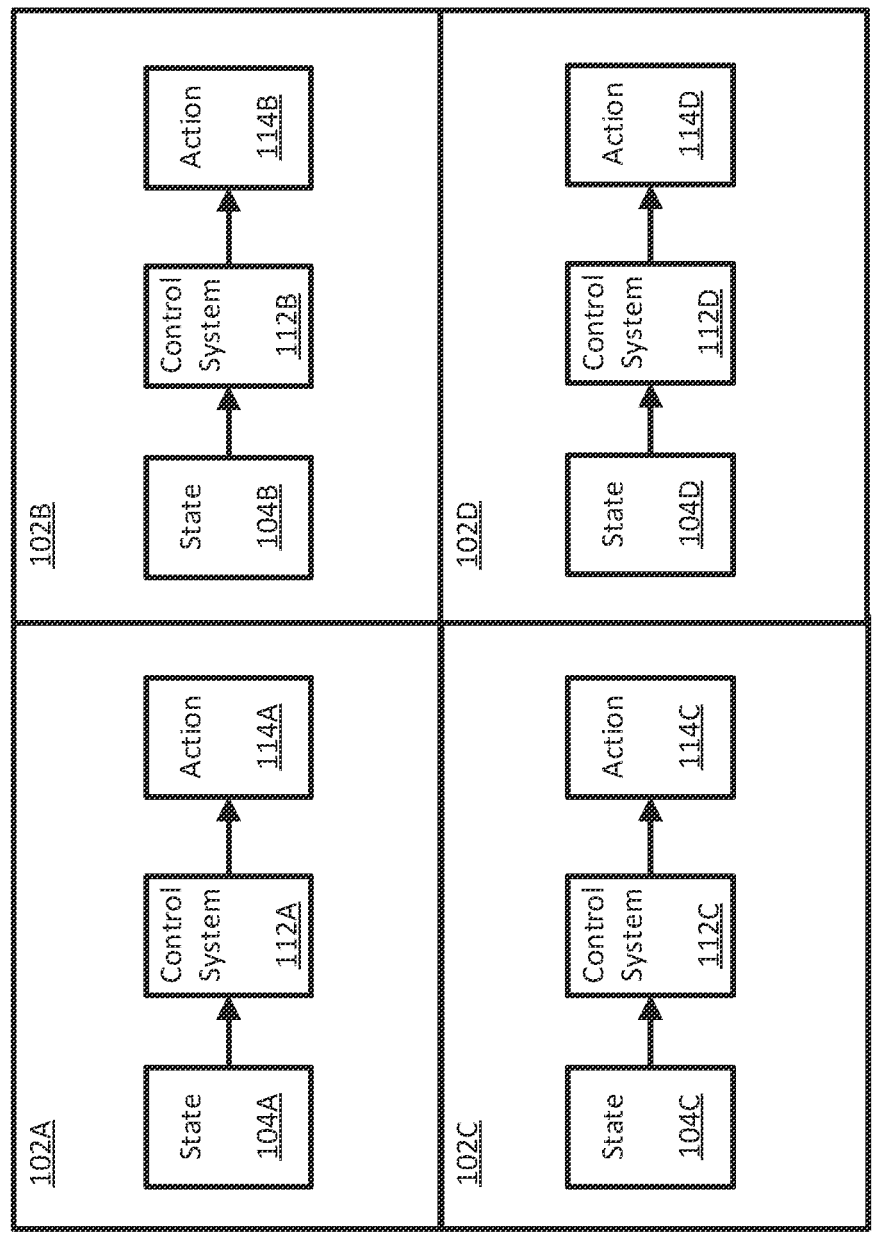

Referring now to FIG. 2, multi-facility location 200 is shown, in accordance with various embodiments. Multi-facility location 200 may comprise several facilities 102A, 102B, 102C, 102D each having different states 104A, 104B, 104C, 104D reflective of potentially different state spaces for different facilities, though each state 104A, 104B, 104C, 104D may be the same or similar in various embodiments. For example, facility 102A may be a grow facility and facility 102D may be a storage facility for harvested plant material. Similarly, facilities 102A, 102B, 102C, 102D may each have difference actions 114A, 114B, 114C, 114D reflective of potentially different action spaces in each facility.

For example, control system 112A may select an action 114A suitable for facility 102A based on the sampled state 104A. Control system 112B may select an action 114B suitable for facility 102B based on the sampled state 104B, and the selected action 114A for facility 102A may differ from the selected action 114B for 102B.

In various embodiments, multi-facility location 200 may thus comprise multiple facilities 102A, 102B, 102C, 102D maintained at different states 104A, 104B, 104C, 104D based on the different parameters and different needs of each facility 102A, 102B, 102C, 102D.

In various embodiments, control systems 112A, 112B, 112C, 112D may be isolated systems located on-site at respective facilities or off-site. Control systems 112A, 112B, 112C, 112D may be operated on discrete computing devices such as a server, computer, smartphone, or other computing device. Control systems 112A, 112B, 112C, 112D may also be implemented using hosted and/or cloud-based computing resources.

Figure 3:
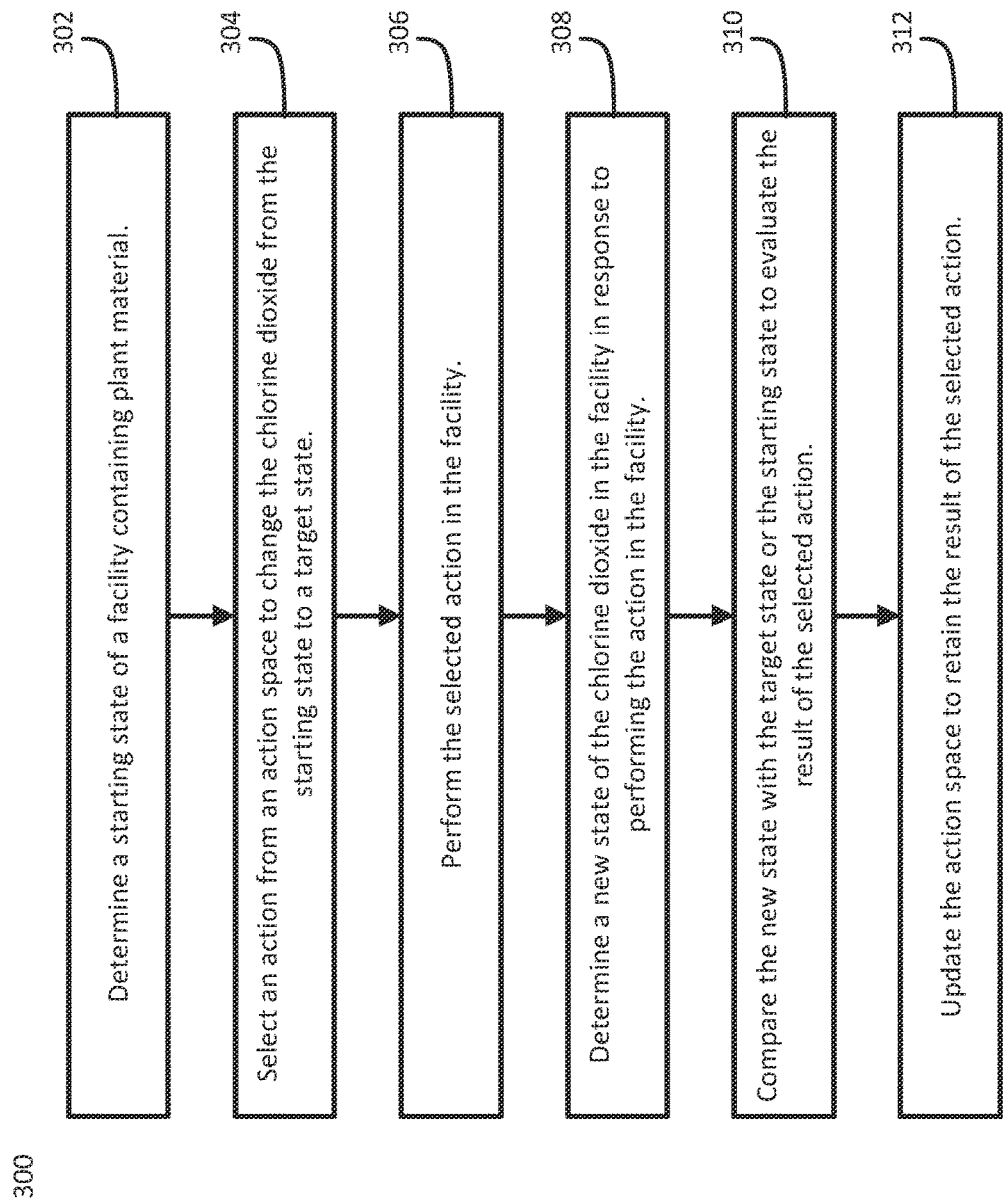

Referring now to FIG. 3, process 300 used by ECS 100 (of FIG. 1) for controlling chlorine dioxide levels in facility 102 (of FIG. 1), in accordance with various embodiments. ECS 100 may determine a starting state of a facility containing plant material. ECS 100 may also select an action 114 (of FIG. 1) from an action space to change one or more of the parameters which comprise the state space in the facility 102 from the starting state (e.g., state 104 of FIG. 1) to a target state (e.g., a desired future state 104 of FIG. 1). ECS 100 may perform the selected action in facility 102 by operating a generation device (116 of FIG. 1) or a consumption device 118 (of FIG. 1) to alter the chlorine dioxide level in the facility.

In various embodiments, ECS 100 may determine a new state of the facility in response to performing the selected action in the facility. Recorded variables may be measured at a point in time, or as a function of readings during the time period. ECS 100 may compare the new state 104 (of FIG. 1) with the starting state 104 (of FIG. 1 at a previous time) to evaluate a result of the selected action 114 (of FIG. 1). ECS may update the action space to retain the result of the selected action 114.

In various embodiments, an effective, facility-level chemical microorganism control agent application system and/or method can comprise substantially preventing proliferation of a microorganism.

In various embodiments, an effective microorganism control agent application system and/or method can comprise substantially reducing a microorganism count in an environment or a crop product. Substantially reducing a microorganism count in an environment or crop product may be evaluated on absolute or relative terms. For example, reducing a microorganism count on relative terms can comprise reducing a rate of increase as compared to an untreated environment that experiences a higher rate of microorganism count increase. In some embodiments, reducing a microorganism count can comprise reducing a indoor/outdoor airborne microorganism ratio, in particular where an outdoor airborne microorganism concentration is increasing and producing increases in indoor airborne microorganism concentrations in untreated areas of a facility. In other circumstances, human activities within a facility, such as plant movement, trimming, or harvest, may result in increasing airborne microbial concentrations in the absence of treatment, and chemical microorganism control agent application in accordance with the systems and methods disclosed herein may be suitable to decrease a rate of airborne microbial concentration increase as compared to an untreated environment.

In various embodiments, an effective microorganism control agent application system and/or method can reduce a microorganism count for one or more microorganisms. In various embodiments, a microorganism can include *Botrytis cinereal, Trichothecium roseum, Alternaria alternata. Aspergillus flavus, Aspergillus fumigatus, Aspergillus niger, Aspergillus terreus*, and fungi from the genera *Penicillium, Rhizopus, Mucor*, and *Cladosporium*, among others. Microorganisms can also include bacteria such as bacteria from the genera *Klebsiella, Enterobacter, Enterococcus, Escherichia, Pseudomonas, Listeria*, and *Salmonella*.

A reduction in a microorganism count or level may be quantified in any suitable manner. For example, a microorganism level reduction from the initial (pre-treatment) microorganism level to a post treatment microorganism level may be expressed as a log reduction in the measured number of microorganisms. In various embodiments, a chemical microorganism control agent treatment method may be effective to produce at least one of about a 0.5 log reduction, a 1.0 log reduction, a 1.5 log reduction, a 2.0 log reduction, a 2.5 log reduction, a 3.0 log reduction, a 3.5 log reduction, a 4.0 log reduction, a 4.5 log reduction, a 5.0 log reduction, a 5.5 log reduction, a 6.0 log reduction, and a 7.0 log reduction.

In various embodiments, a chemical microorganism control agent may be generated and/or dispersed in an environment to be treated. For example, a chemical microorganism control agent may be generated in place in the environment to be treated using any suitable system or composition, or a chemical microorganism control agent may generated or produced offsite and delivered to and dispensed in the environment to be treated. The options for generating and delivering or dispersing a chemical microorganism control agent will be dependent on the agent to be used.

In an aspect, chlorine dioxide can be generated on an on-demand basis, including at a continuous, variable, and/or intermittent rate. Chlorine dioxide gas may be generated using any chemical, electrochemical, or other means now known or devised in the future. For example, chlorine dioxide may be generated as described in U.S. patent application Ser. No. 14/878,603, published as U.S. Patent Application Publication No. 2016/0251219, the entirety of which is incorporated herein by reference for any purpose. Under this procedure, chlorine dioxide gas can be generated by reacting ozone gas with a solid chlorite media, and the chlorine dioxide that is produced can be used as a chemical microorganism control agent in gaseous form. This chlorine dioxide generation method is referred to herein as the "clozone" mechanism. (See also US20180055963A1 for further disclosure regarding controls of generation).

In various embodiments, a system and/or method can comprise periodically adjusting a chemical microorganism control agent application rate in response to one of a measured change or a planned change in a treatment environment parameter. In various embodiments, a planned change can comprise an anticipated or modeled change in a treatment environment parameter. For example, an increase in plant biomass in a treated cultivation facility may be modeled based on past cultivation cycle data, and the model may be used to adjust and/or optimize the chemical microorganism control agent application rate to compensate for increased chemical microorganism control agent consumption by the increasing organic matter load produced by the increasing plant biomass. In various embodiments, other changing treatment environment parameters may be similarly monitored or modeled, such as light intensity (e.g., changes in ambient light levels in a greenhouse setting created by seasonal or weather changes), relative humidity, operator traffic, facility operations in adjacent rooms in a facility (e.g., harvest and trimming operations that may contribute to increased organic matter and/or microbial load in a cultivation facility), and the like.

In various embodiments, a system and method can comprise determining a cultivation facility configuration, taking into account cultivation facility room uses. For example, a facility may comprise crop processing facilities or cultivation areas in which crop manipulations are performed that result in dispersal of airborne microorganisms. A system and method of chemical microorganism agent application can comprise targeted dispensing of a chemical microorganism control agent at a rate effective to substantially mitigate risk of microorganism dispersal from the crop processing or manipulation site to adjacent areas of a facility.

In various embodiments, an effective amount of a chemical microorganism control agent may be applied to a crop or harvested plant material without producing a substantial quantity of a treatment byproduct. In various embodiments, a treatment byproduct can comprise a measurable analyte that may be an analyte monitored for product safety purposes.

In various embodiments, a chemical microorganism control agent may be applied to a crop or a harvested plant material for a treatment duration. A treatment duration may be selected to provide a calculated or measured contact time for the chemical microorganism control agent with respect to the treated crop or harvested plant material during the treatment duration, taking into consideration consumption of the chemical microorganism control agent that may occur during the treatment duration due to any of a number of treatment parameters, as described herein. For example, a treatment duration can comprise a period of at least 10 minutes, at least 15 minutes, at least 20 minutes, at least 25 minutes, at least 30 minutes, at least 35 minutes, at least 40 minutes, at least 45 minutes, at least 50 minutes, at least 55 minutes, at least 60 minutes, at least 75 minutes, at least 90 minutes, at least 120 minutes, at least 150 minutes, at least 4 hours, at least 6 hours, at least 12 hours, at least 18 hours, at least 24 hours, at least 48 hours, or at least 72 hours, at least 96 hours, at least 120 hours, at least 144 hours, at least 168 hours, at least 10 days, at least 14 days, at least 21 days, at least 30 days, at least 45 days, at least 60 days, at least 75 days, at least 90 days, or at least 120 days.

In various embodiments, a method of microorganism control in a plant cultivation environment can comprise measuring a chemical microorganism control agent concentration in situ to determine a measured control agent concentration. For example, during treatment of a plant cultivation environment using chlorine dioxide, the actual chlorine dioxide concentration at various sites throughout the treated space may be measured using any suitable instrument. In various embodiments, a chemical microorganism control agent concentration may be measured using a process challenge device such as a biological indicator or a chemical indicator configured to provide a range of sensitivity suitable to enable evaluation of the presence and/or effective concentration of the chemical microorganism control agent used. The measured chlorine dioxide level may be compared to an estimated concentration (i.e., a planned treatment concentration or an estimated effective concentration) of chlorine dioxide for the plant cultivation environment. The estimated concentration may be calculated taking into consideration any of a number of parameters that may influence the actual concentration in the treatment setting, such as the environmental, plant, and microorganism parameters described herein. If the measured level deviates substantially from the estimated concentration, the application rate of the chlorine dioxide in the treated plant cultivation environment may be adjusted accordingly to bring the measured concentration in-line with the estimated concentration. In various embodiments, the control agent concentration may be measured following adjustment of an application rate to verify that the measured concentration is closer to the estimated concentration following the adjustment. The process of concentration measurement and application rate adjustment described above may be repeated as desired.

In various embodiments, an effective amount of a chemical control agent may be applied to a crop or harvested plant material without producing a substantial negative impact on at least one of vegetative growth, flower or fruit (or other harvested plant material) production, or harvested plant material quality. In various embodiments, a harvested plant material quality may be determined using any suitable attribute. For example, harvested plant material quality may be determined using phytochemical analysis to qualitatively and quantitatively measure the presence of one or more phytochemical analytes of interest.

In various embodiments, harvested plant material can comprise flower or trim material obtained from *Cannabis* plants. Harvested *Cannabis* plant material includes glandular trichomes located on surfaces of the flower and trim material that are of economic value to *Cannabis* producers. The glandular trichomes contain various phytochemical components such as cannabinoid, terpene, and flavonoid natural products that confer the bioactive and organoleptic attributes for which *Cannabis* is valued. Physical or chemical disruption of the glandular trichome structures prior to consumption or processing by various standard methods such as extraction can result in loss of product quality, thereby producing a negative impact on the harvested *Cannabis* plant material quality. Chemical microorganism control agents contemplated herein such as chlorine dioxide have the potential to oxidatively degrade *Cannabis* glandular trichome structures located on the surfaces of growing or harvested *Cannabis* plant material, as well as to oxidatively degrade the natural products associated therewith.

In various embodiments of the present disclosure, application rates of chemical microorganisms control agents may be calculated and/or modulated to avoid or minimize such degradation and associated negative impacts on the quality of treated products. For example, various application rates of gaseous chlorine dioxide may be applied to harvested and cured *Cannabis* flower material for different treatment periods, and the *Cannabis* natural products extracted from the treated flower material and characterized using extraction and phytochemical profiling methods known to a person of ordinary skill in the art to identify chlorine dioxide concentrations and contact times that may be used without detrimental effects on the qualitative and quantitative phytochemical attributes of the treated plant material. In various embodiments, in addition to avoiding or minimizing a detrimental impact on a product quality parameter, a method of microorganism control in accordance with various embodiments may also be suitable to avoid or minimize the presence of any chemical residuals or byproducts of the treatment method and chemical microorganism control agent on the treated product.

In various embodiments, a method of controlling an airborne microorganism in a controlled environmental agriculture setting in response to anticipated or actual meteorological events is provided. Without wishing to be bound by theory, in various controlled environmental agriculture facilities evaluated and monitored by applicants, substantial increases in airborne microbial populations have been observed in response to meteorological events such as rainfall, high winds, substantial changes in temperature, relative humidity, barometric pressure, and/or cloud cover. Similarly, changes in airborne microbial populations have been observed in response to seasonal climatic changes at various locations. Such changes in airborne microbial populations in an outdoor and/or indoor environment can produce significant impacts on crops cultivated in controlled environmental agriculture facilities in locations affected by such meteorological or seasonal changes. In various embodiments, with suitable historic data, changes in airborne microbial populations in an environment in response to meteorological and/or seasonal climatic changes may be anticipated and mitigated with application of effective amounts of chemical microorganism control agent in response to actual or anticipated meteorological or climatic changes.

For example, gaseous chlorine dioxide may be dispensed immediately before, during, and/or following a rainfall event at a level and in a manner effective to substantially reduce an increase in airborne microorganism concentration that may otherwise occur in the absence of such a treatment. In various embodiments, an application may be effective if an airborne microorganism concentration is reduced as compared to a pre-treatment concentration. An application may be deemed effective if an airborne microorganism concentration is reduced as compared to an equivalent, untreated area. An application may be deemed effective if an airborne microorganism concentration ratio of a treated area to an outdoor area is decreased relative to the ratio prior to treatment.

In various embodiments, a method of microorganism control in a plant cultivation environment is provided. A method of microorganism control can comprise a step of determining, at a first time and a first location, a first plant biomass parameter. A method can comprise determining, at the first time and the first location, a first microorganism parameter. A method can comprise determining, at the first time and the first location, a first cultivation environment parameter. A method can comprise determining a first application rate of a chemical microorganism control agent in response to one of the first plant biomass parameter, the first microorganism parameter, and the first cultivation environment parameter. The first application rate may be calculated to produce one of an estimated control agent concentration and a measured control agent concentration. A method can comprise applying the chemical microorganism control agent in the plant cultivation environment at the first application rate for a first treatment period. A method can comprise determining, at a second time and the first location, a second microorganism parameter. A method can comprise determining a microorganism control effect produced in response to the applying the chemical microorganism control agent for the first treatment period by comparing the second microorganism parameter to the first microorganism parameter.

A method such as the method described above can further comprise determining, at the first time, a first crop parameter and determining, at the second time, a second crop parameter. A method can comprise determining a crop effect produced by the applying the chemical microorganism control agent for the first treatment period by comparing the second crop parameter to the first crop parameter. A method can comprise adjusting, in response to one of determining the microorganism control effect and determining the crop effect, the first application rate to a second application rate.

A first plant biomass parameter can comprise, for example a plant type, a plant growth stage, a plant number, a total plant biomass, a total plant surface area, and a plant surface area attribute.

A first microorganism parameter can comprise, for example, a microorganism type, a microorganism count, a microorganism density, a microorganism development stage, and a microorganism pathogenesis stage.

A first cultivation environment parameter can comprise, for example, one of relative humidity, airflow level, airflow pattern, light cycle, light intensity, light wavelength, and temperature cycle.

In various embodiments, applying the chemical microorganism control agent in the plant cultivation environment at the first application rate for the first treatment period is effective to substantially prevent proliferation of a microorganism.

In various embodiments of a method of microorganism control, the first plant biomass parameter can comprise one of a typical commercial vegetative *Cannabis* plant density, a typical commercial flowering *Cannabis* plant density, and a typical commercial *Cannabis* mother plant density.

In various embodiments, the chemical microorganism control agent can be gaseous chlorine dioxide. In various embodiments of methods using gaseous chlorine dioxide, the estimated control agent concentration or the measured control agent concentration need not exceed about 0.1 ppmv during the first treatment period.

A method of microorganism control in accordance with various embodiments can further comprise measuring, between the first time and the second time, a first measured control agent concentration. The first measured control agent concentration may be compared with the estimated control agent concentration. The first application rate may optionally be adjusted to a second application rate in response to the comparing the measured control agent concentration and the estimated control agent concentration.

A method can further comprise deploying, before the first time and at the first location, a process challenge device comprising one of a biological indicator and a chemical indicator. A method can comprise determining, after the second time, an effect of the applying the chemical microorganism control agent on the one of the biological indicator and the chemical indicator.

In various embodiments, a method of microorganism control in a crop production facility is provided. A method of microorganism control in a crop production facility can comprise determining, at a first time and a first location, a first microorganism parameter. The first microorganism parameter may be compared to an action threshold. The method can comprise determining, for the first time and the first location, a first crop production facility parameter. A microorganism control protocol may be recommended in response to one of the first microorganism parameter, the comparing the first microorganism parameter to an action threshold, and the first crop production facility parameter, a microorganism control protocol. The microorganism control protocol may comprise dispensing a microorganism control agent as a gaseous phase product at a first application rate.

In various embodiments, a method can comprise recommending a microorganism control protocol comprising application of the microorganism control agent as a solution phase product.

The microorganism control agent can comprise chlorine dioxide, and the microorganism control protocol can comprise application of a solution phase product to a hard surface at the first location and application of a gaseous phase product at the first location. In various embodiments, the gaseous phase product may be produced from a solid matrix.

In various embodiments, a first microorganism parameter can comprise one of a microorganism spore count or a microorganism count. The microorganism spore count or microorganism count can be obtained from air sampling using active or passive sampling techniques. In various embodiments, the microorganism spore count or microorganism count is obtained using a spore trap.

In various embodiments, the first location can comprise one of a cultivation room, a post-harvest processing room, and a post-harvest conditioning room. The first location can contain one of a growing plant crop or a harvested plant crop.

In various embodiments, a gaseous phase chlorine dioxide product can comprise one of a rapid release product and an extended release product.

A microorganism control protocol can comprise a microorganism control agent application frequency.

The method of in accordance with various embodiments can further comprise determining, at a second time, a second microorganism parameter at the first location. Determining the second microorganism parameter can be performed following an execution of a microorganism control protocol. The second microorganism parameter can be compared to one of the first microorganism parameter and the action threshold. The method can comprise recommending, in response to one of the second microorganism parameter and the comparing the second microorganism parameter, a post-treatment action. A post-treatment action can comprise applying an extended release gaseous microorganism control agent.

In various embodiments, a method of sanitizing an aromatic herbaceous crop material is provided. A method of sanitizing an aromatic herbaceous crop material can comprise enclosing a crop material in a treatment chamber and dispensing a quantity of a gaseous microorganism control agent in the treatment chamber. The crop material can be contacted with the gaseous microorganism control agent at a treatment level for a treatment period to produce a treated crop material. The method can further comprise determining a quantity of crop material to be treated, determining an initial microorganism level of the crop material, and determining a quantity of microorganism control agent to be dispensed in response to one of the quantity of crop material to be treated and the initial microorganism level. The quantity of microorganism control agent may be effective to produce the treatment level in the treatment period. A method can further comprise determining a first phytochemical initial concentration of the crop material, determining a final microorganism level of the treated crop material, and determining a first phytochemical final concentration of the treated crop material.

In various embodiments of a method of sanitizing an aromatic herbaceous crop material, the quantity of microorganism control agent is suitable to produce a microorganism level reduction from the initial microorganism level to the final microorganism level of at least one of about a 0.5 log reduction, a 1.0 log reduction, a 1.5 log reduction, a 2.0 log reduction, a 2.5 log reduction, a 3.0 log reduction, a 3.5 log reduction, a 4.0 log reduction, a 4.5 log reduction, a 5.0 log reduction, a 5.5 log reduction, a 6.0 log reduction, and a 7.0 log reduction.

In various embodiments of a method of sanitizing an aromatic herbaceous crop material, the method produces a first phytochemical concentration change from the first phytochemical initial concentration to the first phytochemical final concentration of less than one of about a 20% change, a 19% change, an 18% change, a 17% change, a 16% change, a 15% change, a 14% change, a 13% change, a 12% change, an 11% change, a 10% change, a 9% change, an 8% change, a 7% change, a 6% change, a 5% change, a 4% change, a 3% change, a 2% change, and a 1% change.

In various embodiments of a method of sanitizing an aromatic herbaceous crop material, the method can further comprise determining a second phytochemical initial concentration, a third phytochemical initial concentration, and an nth phytochemical initial concentration, and determining a second phytochemical final concentration, a third phytochemical final concentration, and an nth phytochemical final concentration.

In various embodiments, a system for controlling an abundance of microorganisms in a plant cultivation environment is provided. A system for controlling an abundance of microorganisms in a plant cultivation environment can comprise a chemical microorganism control agent dispersal system. A system can also comprise an airborne microorganism detection system. A system can also comprise a cultivation environment monitor system. The plant cultivation environment can comprise growing plants. The system can be configured to dispense an effective amount of a gaseous microorganism control agent in response to an input from one of the airborne microorganism detection system and the cultivation environment monitor system.

In various embodiments of a system for controlling an abundance of microorganisms in a plant cultivation environment, the gaseous microorganism control agent can be chlorine dioxide. The system can be configured to dispense an effective amount of gaseous chlorine dioxide suitable to produce a measured chlorine dioxide rate of from about 0.05 ppmh to about 70 ppmh with a contact time of about 1 hr to about 720 hrs.

In various embodiments, the system is configured to produce a measured chlorine dioxide rate of about 0.10 ppmh with a contact time of about 12 hours.

In various embodiments, the system is configured to produce a measured chlorine dioxide rate of about 1.0 ppmh with a contact time of about 12 hours.

In various embodiments, the system is configured to produce an amount of gaseous chlorine dioxide for a time period effective to produce a reduction in visible fungal growth on a surface of a plant.

By way of non-limiting illustration, examples of various embodiments of the present disclosure are provided below.

Example 1

Effects of Chlorine Dioxide Treatment on Terpene and Cannabinoid Content of Fresh and Dried *Cannabis* Flower Experiments were performed to determine the chlorine dioxide gas dose at which a terpene and/or cannabinoid content of fresh and dried *Cannabis* flower were adversely impacted. chlorine dioxide dosage units were determined in mg chlorine dioxide gas/100 grams of flower.

Phytochemical profiling analysis for all samples was performed by a third-party laboratory. Ultra-High-Performance Liquid Chromatography (UHPLC) was used to characterize and quantify 10 major phytocannabinoids found in *Cannabis*. In addition, 21 terpene compounds were characterized and quantified using Head-Space Gas Chromatography with Flame Ionization Detection (HS-GC-FID). The experimental error including both instruments was estimated as approximately 10%. Below are summary data received from the laboratory.

TABLE 2

Dry flower phytochemical profiling data.

| | Weight % | | | | Changes in Wt. % from control | | | |
| --- | --- | --- | --- | --- | --- | --- | --- | --- |
| Dose | THC | CBD | Total Cannabinoid | Total Terpene | THC | CBD | Total Cannabinoid | Total Terpene |
| 0 | 15.17 | 0.17 | 17.56 | 0.76 | 0.00 | 0.00 | 0.00 | 0.00 |
| 10 | 15.03 | 0.00 | 17.11 | 0.80 | −0.14 | −0.17 | −0.45 | 0.04 |
| 14 | 16.19 | 0.05 | 18.60 | 0.69 | 1.02 | −0.12 | 1.04 | −0.07 |
| 25 | 15.93 | 0.01 | 18.28 | 0.82 | 0.76 | −0.16 | 0.72 | 0.06 |
| 50 | 15.37 | 0.01 | 17.52 | 0.78 | 0.20 | −0.16 | −0.04 | 0.02 |

TABLE 1

Fresh flower phytochemical profiling data.

| | Weight % | | | | Changes in Wt. % from control | | | |
| --- | --- | --- | --- | --- | --- | --- | --- | --- |
| Dose | THC | CBD | Total Cannabinoid | Total Terpene | THC | CBD | Total Cannabinoid | Total Terpene |
| 0 | 11.61 | 0.34 | 13.65 | 0.53 | 0.00 | 0.00 | 0.00 | 0.00 |
| 10 | 11.40 | 0.27 | 13.2 | 0.56 | −0.21 | −0.07 | −0.45 | 0.03 |
| 14 | 10.96 | 0.24 | 12.68 | 0.54 | −0.65 | −0.09 | −0.97 | 0.01 |
| 25 | 10.95 | 0.23 | 12.90 | 0.52 | −0.66 | −0.10 | −0.75 | −0.01 |
| 50 | 10.92 | 0.23 | 12.61 | 0.51 | −0.69 | −0.10 | −1.04 | −0.02 |

Fresh flower testing was performed using flower from the same plant that was freshly cut or harvested within 1 hour of beginning the trials. Doses of chlorine dioxide used were 0, 10, 14, 25, and 50 mg of chlorine dioxide gas/100 grams of fresh flower. The dose of 0.0 mg chlorine dioxide gas/100 grams of flower was used as the control sample.

For each of the 5 doses, the sample size was approximately 12 grams of fresh flower. Samples were exposed to the chlorine dioxide gas dose within an air-tight 170-liter (45 gallon) container for 18 hours. Following the 18-hour gas treatment period, the samples were dried and cured. Cannabinoid and terpene concentrations were measured after all flower was dried and cured. Each sample was dried and cured as a batch using the same process as typically found in the industry.

A similar experiment was performed using *Cannabis* flower that was harvested, dried and cured. Dried and cured flower samples where all from the same plant that was previously harvested, dried, and cured as a batch using a typical industry process. Doses used were 0, 10, 14, 25, and 50 mg of chlorine dioxide gas/100 grams of dry flower. The dose of 0.0 mg chlorine dioxide gas/100 grams of flower was used as the control sample.

For each of the 5 doses, the sample size was approximately 3 grams of dry flower. Samples were exposed to the chlorine dioxide gas dose within an air-tight 35-liter container for 18 hours. Cannabinoid and terpene concentrations were measured for all treated samples.

The results show that none of the chlorine dioxide treatment rates used produced substantial changes in the total cannabinoid or terpene concentrations. The small changes seen in the raw data are all within experimental error of the control sample. Although the data suggest that no adverse impact was found, at doses of 725 mg and 50 mg, the terpene smell was diminished to the human nose.

Example 2

Effects of Chlorine Dioxide on Vegetative Growth

Experiments were performed to determine the effects of using a continuous release dose of about 3 mg of chlorine dioxide per hour on the vegetative growth of *Cannabis* plants.

*Cannabis* plants were placed in a grow tent and grown under artificial lighting for 10 days. Leaf counts were performed prior to placing in the tent and again after 10 days. Two separate grow tents were used, one for the experiment and one as the control. The total leaf count was compared between the experimental and control plants. Temperature and relative humidity measurements were taken 3 times per day to ensure both tents maintained the same environmental conditions.

Each tent had a total volume of 240 cubic feet and an identical grow light placed inside. A pouch was hung from the top of the inside of the experimental tent. The pouch dispensed approximately 3 mg of chlorine dioxide per hour for the duration of the trial (10 days). Within the experimental tent the *Cannabis* plants were exposed to about 720 mg of gaseous chlorine dioxide over the 10-day period.

Three *Cannabis* plants were placed into each tent. Two of the plants were of a *Cannabis indica* variety, and one plant was a *Cannabis sativa* variety. The photoperiod used in both tents was 20 hours with lights on followed by 4 hours with lights off. All watering, nutrients, pest control, etc. were identical for all plants.

Results

The table below shows the leaf count for all plants initially and after 10 days in the grow tent. In addition, none of the plants showed any visible sign of adverse effects. Notably, in this particular experiment, the grow tent volume was about 16 times smaller than would be recommended for the pouch that was used to generate the chlorine dioxide (e.g., 240 cubic feet in the tent versus 4000 cubic feet if the product had been used in an actual cultivation environment in accordance with product instructions). This means that the concentration of chlorine dioxide for this experiment was about 16 times higher than would be used in an actual cultivation environment.

TABLE 3

Effects of chlorine dioxide treatment on vegetative growth of cannabis plants.

| Plant | Initial | Final | # of new leaves |
|---|---|---|---|
| Control | | | |
| Indica | 22 | 66 | 44 |
| Indica | 21 | 98 | 77 |
| Sativa | 35 | 62 | 27 |
| Experimental | | | |
| Indica | 24 | 92 | 68 |
| Indica | 25 | 61 | 36 |
| Sativa | 31 | 83 | 52 |

Example 3

Toxicity Responses of *Cannabis* Plants to Foliar Applications of Chlorine Dioxide Regular and excessive rates of chlorine dioxide dissolved in water were sprayed up to five times at 2-day intervals on two varieties of *Cannabis* plants in both vegetative and flowering stages to determine if plant damage would result. Adverse effects were assessed based on visible discoloration or chlorosis of leaves and/or flowers. All plants were monitored for several days after the final application of chlorine dioxide.

Experiments were performed in a greenhouse with temperatures between 70° F. and 80° F. Plants were potted in soil and appeared healthy and undamaged prior to treatment. All plants received the same amount of water and nutrients as controls, delivered via soil drenching. All plants, including controls, were the same age. At the beginning of the experiments, both flowering and vegetative plants had 3 weeks of the respective growth stage remaining.

Concentrations of chlorine dioxide tested include 0, 50, 100, and 500 ppm. All chlorine dioxide solutions were prepared from 500 ppm stock solution, mixed in containers and used immediately. Each of the rates was tested in triplicate with separate plants in both stages of growth and with *Cannabis indica* and *Cannabis sativa Cannabis* plants.

A common trigger sprayer bottle with the tip adjusted to a mist setting was used to apply treatments. Plants were sprayed until all leaves and stems were visibly wet. Each treatment rate was applied at 2-day intervals, and the number of applications ranged from 1 to 5 depending on the amount of damage that occurred to the plant.

Damage was assessed 2 days after an application and prior to the next application. Treated plants were assessed for damage 6 days after the 5th and final spray treatment. Observed symptoms associated with the application of chlorine dioxide were necrosis of leaf tissue appearing as lesions between and across leaf veins and at leaf margins. Early symptoms included yellowing of leaves. Some lesions had dark brown borders and/or appeared desiccated.

No foliar or flower tissue damage was visible for plants treated with 0 or 50 ppm chlorine dioxide (five applications at 2-day intervals), and plants treated with 50 ppm chlorine dioxide were indistinguishable from the control plants treated with water.

Vegetative plants of both varieties treated with 100 ppm chlorine dioxide exhibited visible damage to leaves following the fourth application. None of the *sativa*-type flowering plants exhibited damage to leaves or flowers at 100 ppm chlorine dioxide. Two out of the three *indica*-type flowering plants treated with 100 ppm chlorine dioxide only exhibited damage to leaves two days after the 4th application. All plants treated with 500 ppm chlorine dioxide exhibited leaf damage 24 to 48 hours after a single application. Damage to floral tissue was evident as some discoloration after the third application in 1 of the 3 *sativa*-type plants and 2 of the 3 *indica*-type plants. All plants treated with 500 ppm chlorine dioxide exhibited tissue damage after the fifth application and did not have the same smell as control plants. This was attributed to oxidation of terpenes produced in the flower.

Example 4

Toxicity Responses of *Cannabis* Plants to Applications of Gaseous Chlorine Dioxide Two varieties of *Cannabis* plants in both vegetative and flowering stages were exposed to various amounts of chlorine dioxide gas to determine if plant damage would result. Adverse effects were based on discoloration or chlorosis type damage to leaves and/or flowers. Leaves of each plant were collected prior to experiments and again 2 days post treatment for tissue analysis. Leaf samples were sent to a third-party laboratory for analysis of nutrients and total chloride ($Cl^-$). Tissue analysis of leaves pre- and post-treatment were compared to determine uptake of chlorine dioxide and/or its by-products. Control plants were used for visual comparison in determining plant damage. All plants were monitored for several days after application of chlorine dioxide gas. Plants were potted in soil and appeared healthy and undamaged unless otherwise noted. All plants including controls were of the same age for each growth stage.

The chlorine dioxide gas exposure was based on concentration with units of mg of chlorine dioxide per cubic foot of space.

As a reference, baseline readings of the concentration of chlorine dioxide monitored in a space that was clean and devoid of anything that can consume chlorine dioxide are shown in supplemental excel documents.

Baseline Readings

The concentration versus time data for the release of chlorine dioxide gas shows the peak concentration achieved is consistent with the amount of chlorine dioxide that is added to the space. In addition, doubling the amount of chlorine dioxide in the same volume of space doubles the concentration. Then by decreasing the volume of space by 6.4 times and adding the same amount of chlorine dioxide, concentration increased by 6.4 times. Based on this, an estimation of the peak concentration of chlorine dioxide can be made using various weights of chlorine dioxide and volume of space.

Trial 1

A first trial was performed in a space of 1550 cubic feet with four healthy plants in the space, two of which were in flower at week 5 of 8, and the other two of which had one week of vegetative stage remaining. The chlorine dioxide dose was 1.9 mg chlorine dioxide per cubic foot of space (one 25 g ProKure® G Fast Release Gas packet (ProKure® Solutions, Phoenix, AZ) and 4 liters of 500 ppm chlorine dioxide solution). Contact time was 18 hours, and the room was maintained in darkness for the duration of the contact time.

Immediately following the 18 hours of contact time, the plants still appeared healthy. After 24-48 hours post-treatment, all 4 plants showed damage in the form of yellowing and chlorosis. Many leaves appeared desiccated and eventually fell off. Although none of the 4 plants died, the damage was too extensive to be considered a viable dose. A dose of 1.9 mg chlorine dioxide per cubic foot was considered detrimental.

Figure 4:
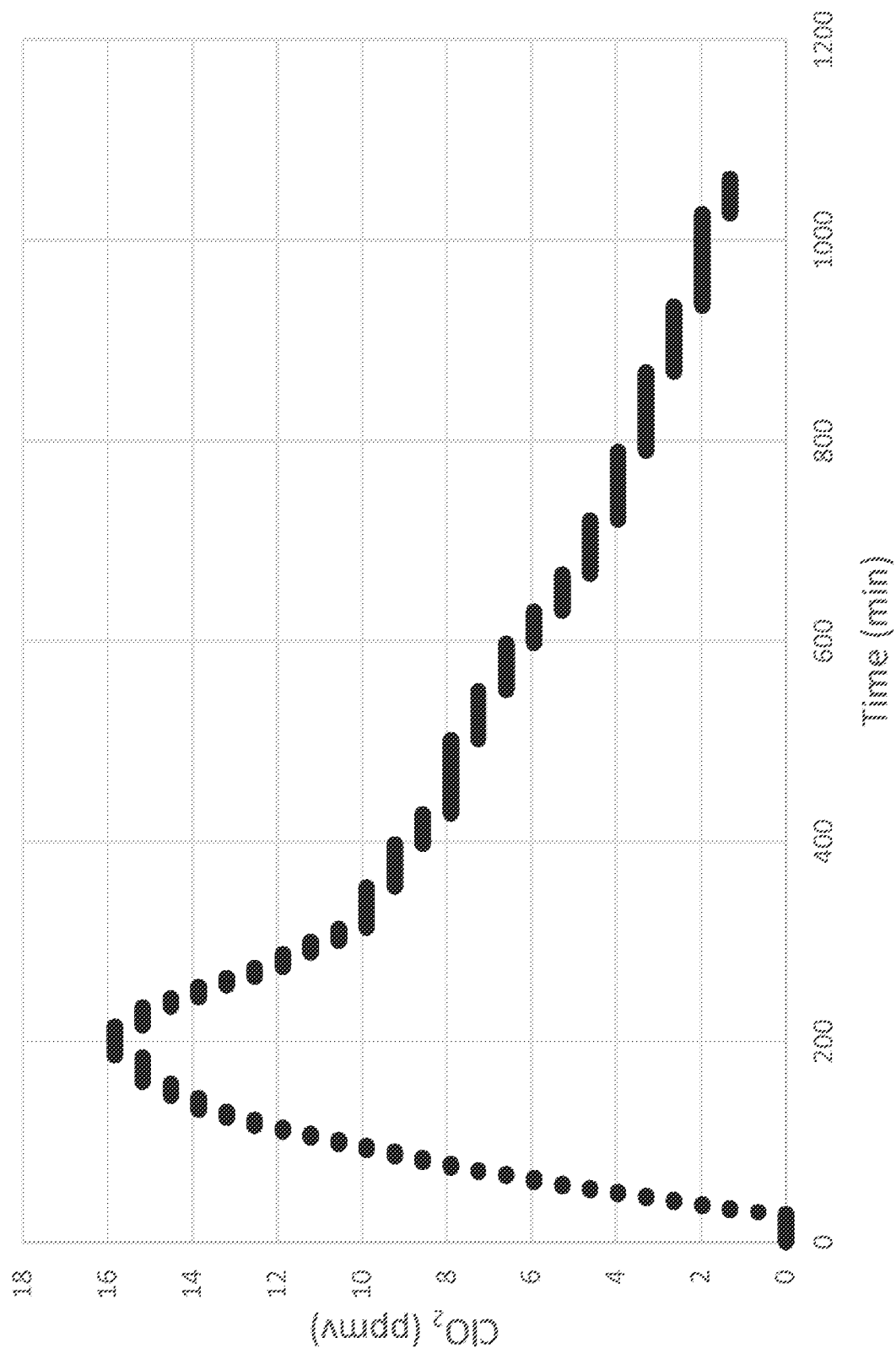

The theoretical maximum concentration is approximately 23 ppmv (parts per million by volume) chlorine dioxide. FIG. 4 shows a plot of chlorine dioxide concentration measured in the 1550 ft3 room during the 18-hour chlorine dioxide treatment. The chlorine dioxide concentration reached a measured maximum of about 16 ppmv. In theory, the plants present in the room are responsible for consumption of the chlorine dioxide, and the difference in maximum as well as the decrease in chlorine dioxide concentration over time are attributed to the consumption of chlorine dioxide by the plants in the space. The lower concentration can be explained by the plants acting as a sink for the gaseous chlorine dioxide. As the gas equilibrates throughout the space it contacts the plants and is consumed. Also, as the chlorine dioxide concentration decreases over time, the rate of contact and rate of consumption likewise decreases.

Trial 2

A second trial was performed in a space of about 33400 cubic feet with 840 flowering plants at week eight of an eight-week cultivation cycle. All plants were healthy. This is the same situation as in Trial 3 but the plants in Trial 2 did not have mold. The chlorine dioxide dose was 0.45 mg chlorine dioxide gas per cubic foot of space. Contact time was 18 hours, and the room was maintained in darkness for the first 12 hours, and grow lights came on for the last 6 hours of contact time, but the chlorine dioxide gas concentration monitoring was only performed for about 10 hours.

Figure 5:
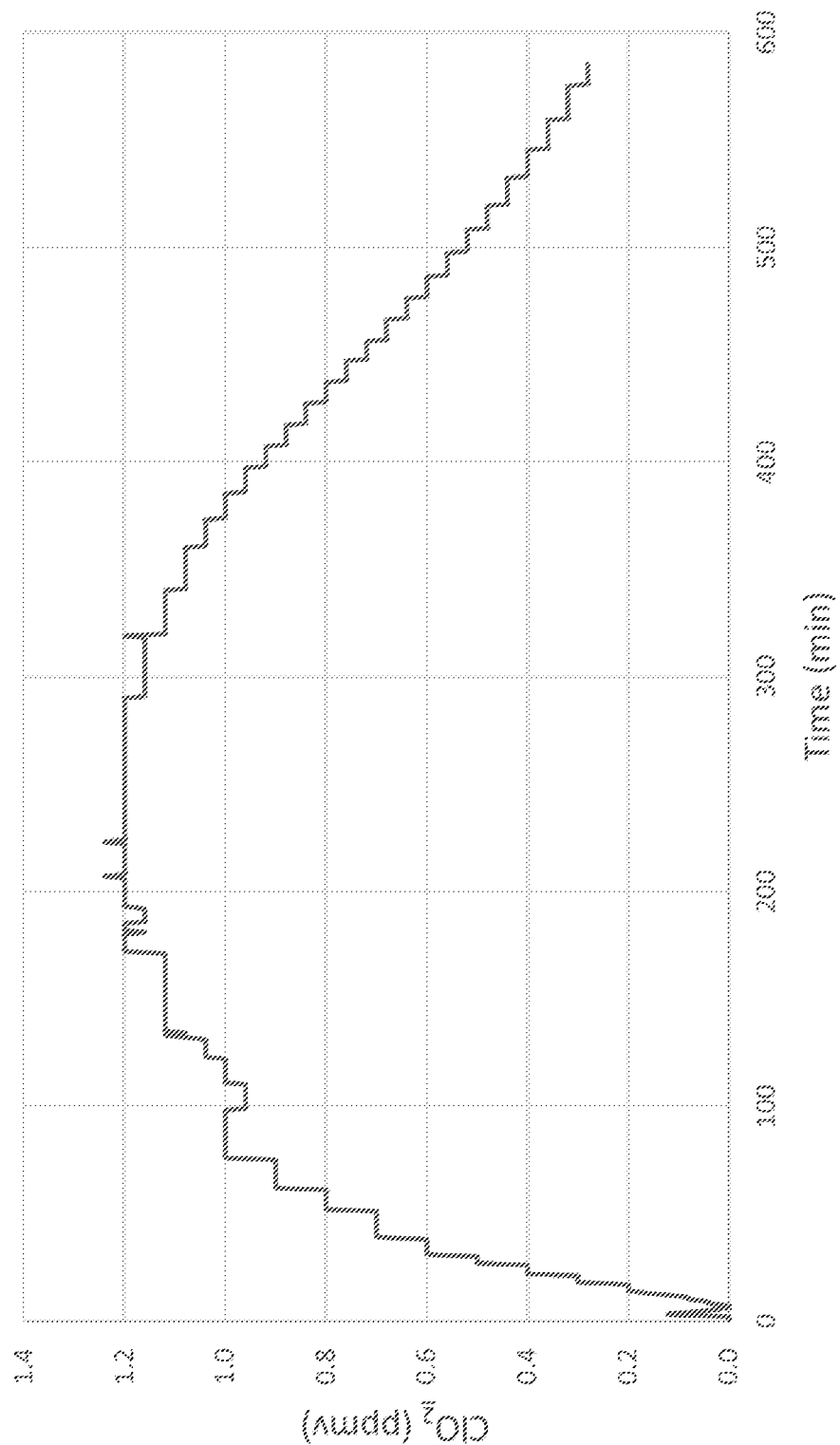

The theoretical maximum concentration is approximately 5 ppmv chlorine dioxide. FIG. 5 shows a plot of chlorine dioxide concentration measured in the room during the first 10 hours of the 18-hour chlorine dioxide treatment. The chlorine dioxide reached a measured maximum of about 1.2 ppmv. Without wishing to be bound by theory, the plant tissue present in the space are assumed to be responsible for consumption of the chlorine dioxide. The difference in maximum chlorine dioxide concentration as compared to dispensing an equivalent quantity of chlorine dioxide in an empty space, as well as the rate of chlorine dioxide decrease after the maximum measured concentration was achieved, were attributed to the consumption of chlorine dioxide by the plants in the space. All plants remained healthy and undamaged by the 0.45 mg chlorine dioxide per cubic foot exposure rate.

Trial 3

A third trial was performed in a 33400 cubic foot space with 840 flowering plants at week eight of an eight-week cultivation cycle. Most plants had visible mold growing on flowers. The chlorine dioxide dose was 0.45 mg chlorine dioxide gas per cubic foot of space. Contact time was 18 hours, the room was maintained in darkness for the first 12 hours, and grow lights came on for the last 6 hours contact time, but the chlorine dioxide gas concentration monitoring was only performed for about 10 hours.

Figure 6:
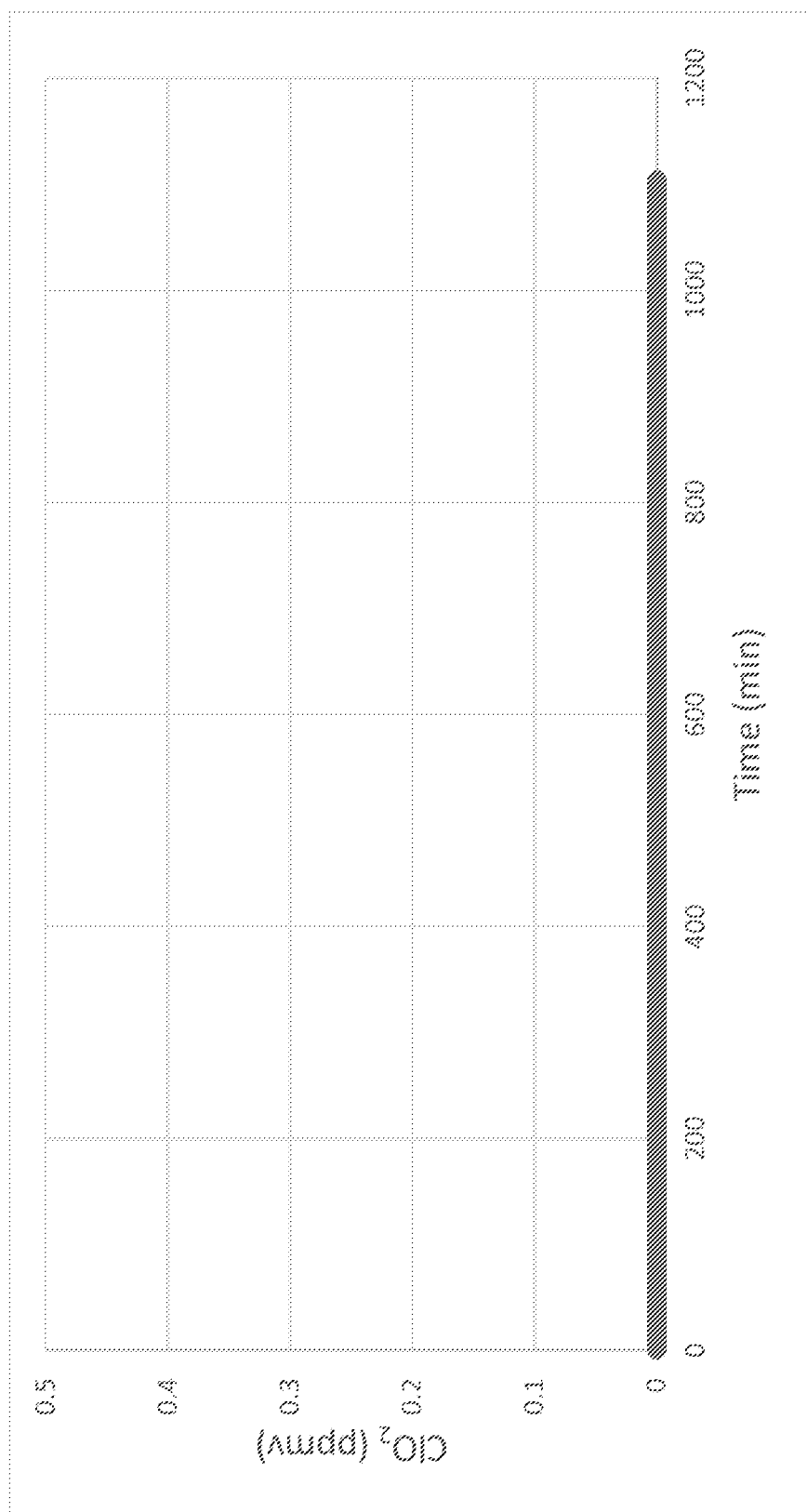

The HVAC system for the 33400 cubic foot space that had 840 flowering plants in the last week of flower failed. Within hours the temperature and humidity increased, and visible mold growth was found on most of the flower within 24 hours. To treat the mold and potentially prevent the loss of over 100 pounds of *Cannabis* flower product, a dose of 0.45 mg chlorine dioxide gas per cubic foot was dispensed into the space (14× ProKure® G Fast Release Gas packets (25-gram) (ProKure® Solutions)). As can be seen in FIG. 6, the measured concentration of chlorine dioxide over 18 hours was 0 ppmv. Essentially, it was never above the detection limit of the sensor (0.5 ppmv). In addition, there was no chlorine dioxide smell during the 18-hour treatment period. An odor would be expected for this application rate, so the lack of odor provides further evidence that the concentration of chlorine dioxide remained below the odor threshold of about 0.03 to 0.1 ppmv. The majority of the chlorine dioxide gas was assumed to be consumed by the mold on the plants and mold spores in the air, while some was likely consumed by other microorganisms and/or viruses within the cultivation room. No mold was visible on the plants after the application and the flower was harvested a few days later.

Plant Tissue Analysis

Levels of various plant nutrients in plant tissues were measured before and after chlorine dioxide treatment for plants in Trial 1 described above. Measured nutrient levels before and after treatment generally showed little difference (Table 4), and chloride levels of leaf tissues remained unchanged, suggesting that leaves do not uptake chlorine dioxide or its by-products. Chloride levels were of particular interest, since chloride is a typical by-product of chlorine dioxide treatment; however, no significant increase of chloride was observed for the treated plant tissues following the chlorine dioxide treatments.

TABLE 4

Plant tissue analysis results.

|  | Trial 1 Veg plants | | Trial 1 Flowering Plants | |
| --- | --- | --- | --- | --- |
|  | Before | After | Before | After |
| Nitrate ppm | 12500 | 12700 | 5500 | 5400 |
| Phosphate ppm | 2800 | 2800 | 2600 | 2400 |
| Total (N) % | 4.1 | 3.9 | 2.6 | 3.2 |
| Total (P) % | 0.76 | 0.77 | 0.35 | 0.43 |
| Potash (K) % | 3.1 | 2.9 | 2.9 | 3.1 |
| Calcium (Ca) % | 3.6 | 3.8 | 2.8 | 2.8 |
| Magnesium (Mg) % | 1.4 | 1.2 | 0.85 | 0.94 |
| Sulfur (S) % | 0.61 | 0.27 | 0.2 | 0.23 |
| Sodium (Na) % | 0.02 | 0.02 | 0.03 | 0.02 |
| Iron (Fe) ppm | 230 | 200 | 140 | 150 |
| Zinc (Zn) ppm | 48 | 51 | 36 | 39 |
| Manganese (Mn) ppm | 33 | 35 | 55 | 52 |

TABLE 4-continued

Plant tissue analysis results.

|  | Trial 1 Veg plants | | Trial 1 Flowering Plants | |
| --- | --- | --- | --- | --- |
|  | Before | After | Before | After |
| Copper (Cu) ppm | 7.1 | 7.5 | 8.5 | 9.7 |
| Boron (B) ppm | 99 | 92 | 50 | 65 |
| Molybdenum (Mo) ppm | 0.74 | 0.69 | 1.7 | 1.8 |
| Chloride (Cl⁻) ppm | 5600 | 5300 | 24900 | 24600 |

Conclusions

The difference in theoretical maximum concentration and actual concentration of each trial varied depending on how many plants were in the space and whether the plants had mold on them or not. Trial 1 with 4 plants (387.5 cubic feet per plant) reached 70% of the maximum. Trial 2 reached about 23% of the maximum with 840 (37.4 cubic feet per plant) healthy with no mold on plants. Trial 3, with plants carrying a heavy mold load, did not reach a measurable chlorine dioxide concentration. In the trials that yielded concentration versus time data (trials 1 and 2) the maximum concentration was met at about the same length of time that the clean room experiments (see supplemental excel files) yielded, but in the trials the concentration decreases much quicker, demonstrating that the gas is being consumed by the plants. chlorine dioxide consumption in a defined space is dependent on the organic matter load in the space, including both plant tissue and any microbial matter present in the space, in addition to other environmental parameters.

Example 5

Chlorine Dioxide Treatment and Prevention of Fungal Counts in Cultivation Setting Very low-level chlorine dioxide protection using about 3 mg chlorine dioxide gas per hour for every 4000 cubic feet (50-gram ProKure® D Extended Release Gas product (ProKure® Solutions), 2000 mg total over 4 weeks) was tested to determine the effects on reduction and prevention of fungal microorganism counts. The rate of chlorine dioxide production will vary depending on the relative humidity (RH) in the room. The above rate is for RH range of 40-60%. Each 3 mg chlorine dioxide per hour product (50-gram) unit will cover 4000 cubic feet of space. The 4000 cubic foot volume is recommended for safety reasons. This volume of space insures that the concentration of the gas remains below the OSHA regulated Permissible Exposure Limit (PEL) which is 0.1 ppmv (time weighted average (TWA) over a 8-hours per day or 40-hour work week) and the Short Term Exposure Limit (STEL) which is 0.3 ppmv (TWA over any 15-minute period) for chlorine dioxide.

By calculation, if 3 mg of chlorine dioxide gas is released over a 1-hour period into a space that is 4000 cubic feet, the concentration would be approximately 0.007 ppmv at the end of the 1-hour period. Even after 14 hours of chlorine dioxide dispensed at the above rate, the chlorine dioxide concentration will be less than 0.1 ppmv, or under the PEL.

Chlorine dioxide will break down upon exposure to light. The half-life decreases as a function of increasing light intensity and is also dependent on the wavelength of light. Since the decomposition is highly dependent on the nature of the light, it is difficult to determine a generic half-life for use in any type of calculation. For reference, the half-life is about 300 minutes under fluorescent lights found in a typical office building and is likely about 10 minutes when exposed to intense sunlight. An advantage of this decomposition is that it can help to minimize exposure of employees, since employees are typically present in a treated cultivation space during daylight hours when sunlight and/or grow lights are likely to be on.

Experimental Data

All data is based on the dose described a unless otherwise noted. The spore counts per cubic meter prior to treatment are compared to spore counts per cubic meter post treatment with the treatment time indicated. All spore trap data was collected using a typical inertial impaction sampler. All samples were collected using an Air-O-Cell spore-trap (Zefon International, Ocala, FL) with a total of 75 liters of air being drawn through the trap over a 5-minute period. Each spore trap was sent to a professional laboratory for analysis. The analysis includes the identification and enumeration of each type of mold spore found in the sample with results given as the number of each type of spore and the total spores per cubic meter.

An experimental trial was performed in a greenhouse with approximately $1 \times 10^6$ cubic feet of space holding 4500 mother plants. All plants were potted in soil and were approximately 5-7 feet tall, depending on whether cuttings had recently been taken for clone propagation. Plants evidenced visible signs of infection with an unidentified fungal strain having an appearance similar to powdery mildew. The fungus was actively growing and covered most leaves and major stalks. The fungus was a strain that only infected the surface of the plants and was not systemic in the plants.

Treatment was performed using 1.2 mg chlorine dioxide gas per hour per 4000 cubic feet. Spore trap testing was performed pre-treatment and at seven days post-treatment. The fungus could not be detected by visual inspection after about 30 days of treatment. Treatment continued as a preventative measure, with further spore trap testing at 45 days post treatment. Spore trap data follows below in Table 5.

TABLE 5

Results of spore trap testing for chlorine dioxide treated greenhouse holding cannabis mother plants showing evidence of fungal infection.

|  | Count | | |
| --- | --- | --- | --- |
| Spore Type | Pre-Treatment | 7 Days Post-Treatment | 45 Days Post-Treatment |
| Alternaria | 53 | 0 | 0 |
| Ascospores | 120 | 27 | 0 |
| Aureobasidium | 13 | 0 | 0 |
| Basidiospores | 480 | 53 | 0 |
| Bipolaris/Drechslera | 13 | 0 | 0 |
| Chaetomium | 13 | 0 | 0 |
| Cladosporium | 1500 | 54 | 0 |
| Fusarium | 13 | 0 | 0 |
| Oidium | 164 | 13 | 0 |
| Penicillium/Aspergillus | 134 | 0 | 0 |
| Smuts/Myxomycetes | 107 | 173 | 13 |
| Torula | 13 | 0 | 0 |
| Ulocladium | 13 | 0 | 0 |
| Total | 2636 | 320 | 13 |

Example 6

Post-Harvest Remediation of *Cannabis* Flower and Trim Material

Harvested *Cannabis* flower and/or trim (leaf and stem tissue used for the extraction of cannabinoids) are treated with chlorine dioxide gas to reduce the presence of viable microorganisms that may give rise to non-passing microbial rates in product safety tests. Several individual small batches of flower and trim are exposed to various rates of chlorine dioxide to determine effective rates for decreasing the levels of microorganism contamination as well as to determine rates which may produce negative impacts on product quality parameters such as cannabinoid or terpene levels, considered either as total cannabinoids or terpenes, or at the individual cannabinoid or terpene level.

Freshly harvested *Cannabis* flower and trim materials are divided into measured batches of equal quantities by material weight. Batches of material are placed in curing chambers or substantially air-tight chambers of suitable volume. Samples are removed from each batch of material for pretreatment microbial testing and phytochemical analysis. A small fan may be placed in a chamber to ensure effective air circulation through the chamber. Chlorine dioxide is deployed in a manner suitable to produce target chlorine dioxide gas concentration in chamber over a desired treatment duration. Following treatment, the chamber is ventilated and treated material removed to an appropriate container, and samples of treated material (including untreated control sample) are sent for microbial testing and phytochemical analysis.

Example 7

Evaluation of Room Turn Protocol on Environmental Microbial Load

Study areas consist of different rooms of identical dimensions within an indoor *Cannabis* cultivation facility. Each room is fully enclosed and 30 ft wide by 90 ft long with a 12 ft ceiling height to yield an enclosed volume of 32,400 $ft^3$. Environmental conditions are optimized for the cultivation operation. Relative humidity ranges from 55-65%, and temperature ranges from 72-78° F. A centralized HVAC system provides air handling for the entire facility, and each room is not individually maintained. Within each room, air is distributed using several fans mounted on walls and with air handlers attached to flexible and perforated 18" tubing mounted above the canopy. Lights are positioned at about 10 feet from the floor.

Room Turn Protocol

Prior to the current study, each room contained approximately 800 flowering *Cannabis* plants that had been growing in the space for approximately 8 weeks. Initial sampling is performed approximately 4 hours after harvesting of the plants from each room to ensure the lack of false positives due to the high activity of harvesting and prior to any type of cleaning or sanitizing/disinfecting. HVAC ducts closed during treatment to prevent air exchange via the HVAC system. A general cleaning is performed for each room prior to application of any chlorine dioxide. After general cleaning, the test room is cleaned using a chlorine dioxide solution with 100 ppm chlorine dioxide in water is applied at 1 gallon per 250 ft2 to all surfaces compatible with water exposure (walls, floors, fans, drains, etc.) and allowed to air dry for 10-20 minutes. Following application of the chlorine dioxide solution, gaseous chlorine dioxide is deployed at a rate of about 1000 mg per 2250 ft3 (15000 mg chlorine dioxide gas total). The gas is contained in the room overnight or about 10 hours. No chlorine dioxide solution or gas is used for the second, control room following the general cleaning.

Following cleaning, the rooms are used for cultivation of another crop of 800 *Cannabis* plants in each room. Plants are in 3-gallon pots with soil as media and automated drip irrigation/fertigation being used. Plants are grown to flowering, and environmental microbial sampling is performed for each from at several points during the flowering period.

Sampling Procedure

Environmental microbial sampling is performed using a passive air sampling technique and 9 cm diameter Petri dishes containing potato dextrose agar (PDA). The sampling height is set to 1 M which approximates the canopy height of the plants in the flowering bay. Sampling time is 15 minutes. After exposure, the plates are taken to the laboratory and incubated at 72° F. for 7 days. Surface samples are also taken using standard techniques. The number of colony-forming units (CFU) per unit volume in each room is determined for each plate using standard methods, and results for the treated versus untreated rooms are compared.

Example 8

Effect of Low-Level Gaseous Chlorine Dioxide Application on Airborne Microorganism Load and Flower Quality Parameters for Flowering *Cannabis*

*Cannabis* plants are grown in identical, adjacent cultivation bays in an indoor cultivation facility using standard methods. Plants are genetically and developmentally identical and cultivated under identical environmental conditions monitored using standard equipment. A treatment room is treated with gaseous chlorine dioxide at a rate of approximately 3 mg chlorine dioxide gas per hour per 4000 cubic feet (ProKure® D Extended Release Gas (ProKure® Solutions)) for the duration of the cultivation cycle. A control room remains untreated. Plants are grown to maturity and harvested. Airborne microbial sampling is performed using settling plates on a weekly basis throughout the cultivation cycle. Following harvest, flower material is extracted and phytochemically profiled using standard techniques to determine any impact of chlorine dioxide treatment on quantitative and qualitative phytochemical crop quality attributes including detailed cannabinoid and terpene constituents.

Example 9

Effect of Proactive Low-Level Gaseous Chlorine Dioxide Application in Response to Weather Events on Airborne Microorganism Load in a Controlled Environmental Agriculture Setting Identical, adjacent cultivation bays in an indoor, controlled environmental agriculture setting are configured with substantially functionally equivalent environmental control capabilities and equivalent settings are applied that are suitable for cultivation of floriculture or specialty vegetable crops. Interior and ambient (outdoor) environmental conditions are continuously monitored, along with predicted weather events for the ambient environment. Interior airborne microbial populations are actively and passively sampled using standard techniques on a daily basis to quantitatively and qualitatively assess the composition of airborne microorganisms in each cultivation bay. Low-level gaseous chlorine dioxide is continuously dispensed in a first test cultivation bay at a concentration compatible with crop production without detrimental crop impact. Low-level gaseous chlorine dioxide is likewise continuously dispensed in a second test cultivation bay, with additional dispensation of a rapid release gas chlorine dioxide treatments (such as ProKure® G Fast Release Gas product (ProKure® Solutions)) in response to anticipated or actual adverse weather events correlated with increased airborne microbial populations, the rapid release gas chlorine dioxide treatment also compatible with crop cultivation without detrimental crop impact. An otherwise equivalent control cultivation bay receives no chlorine dioxide treatment. The experiment is maintained through one or more rain events with rainfall of more than 5 mm, with rapid release gas chlorine dioxide treatment dispensed the day before the rain event, the day of the rain event, and the day following the rain event. Total airborne microbial counts and microbial counts by specific microorganism are determined for each cultivation bay for each day of the experimental time course. Daily total and specific microorganism counts are compared for each cultivation bay across the experimental time period. The experiment is repeated to assess typical patterns of airborne microbial counts in response various types of meteorological events.

Example 10

Empiric Determination of Rates of Gaseous Chlorine Dioxide Consumption by Airborne Microorganisms Three identical, adjacent cultivation bays in an indoor, controlled environmental agriculture setting are configured with substantially functionally equivalent environmental control capabilities and equivalent settings are applied that are suitable for cultivation of floriculture or specialty vegetable crops. Interior environmental conditions are continuously monitored. A room turn cleaning protocol is performed prior to initiation of experimental treatments to substantially eliminate baseline airborne microbial populations. Interior airborne microbial populations are actively and passively sampled using standard techniques on an hourly basis during the experimental treatments to quantitatively and qualitatively assess the composition of airborne microorganisms in each cultivation bay. Gaseous chlorine dioxide concentrations in each cultivation bay are continuously monitored throughout each experiment. Experimental airborne microbial loads are artificially created in two of the three cultivation bays by aerosolizing and dispersing known quantities of various selected airborne microorganisms common in controlled environmental agriculture settings to produce calculated airborne populations of the selected microorganism. Calculated airborne microorganism population concentrations in each bay are verified by hourly experimental sampling. Gaseous chlorine dioxide is dispensed in a test cultivation bay at a first concentration. A first control cultivation bay with experimentally dispersed microorganisms receives no chlorine dioxide treatment. A second control bay not subject to experimentally dispersed microorganisms receives the same chlorine dioxide treatment as the test cultivation bay. Chlorine dioxide concentration levels in the test and control bays are continuously monitored in parallel with the airborne microbial population sampling to establish a baseline measured chlorine dioxide concentration curve, a baseline airborne microbial concentration curve for the selected experimentally dispersed microorganism, and chlorine dioxide and airborne microbial concentration curves for the test cultivation bay in which both are present and interacting. Test and control curves are compared to determine the airborne microorganism concentration dependent chlorine dioxide consumption rate under characterized environmental conditions. The experiment is repeated with changes to variables including the selected microorganism, mixed microorganism populations, dispensed chlorine dioxide levels, and various environmental condition parameters including temperature, relative humidity, light intensity, presence of soil media, presence of plant biomass, and the like, to empirically elucidate the interactions of various airborne microorganism conditions and environmental parameter conditions on consumption of gaseous chlorine dioxide in a controlled environmental agriculture setting.

Example 11

Empiric Determination of Rates of Gaseous Chlorine Dioxide Consumption by Plant Biomass Three identical, adjacent cultivation bays in an indoor, controlled environmental agriculture setting are configured with substantially functionally equivalent environmental control capabilities and equivalent settings are applied that are suitable for cultivation of floriculture or specialty vegetable crops. Interior environmental conditions are continuously monitored. A room turn cleaning protocol is performed prior to initiation of experimental treatments to substantially eliminate baseline airborne microbial populations. Interior airborne microbial populations are actively and passively sampled using standard techniques on a daily basis during the experimental treatments to quantitatively and qualitatively assess the composition of airborne microorganisms in each cultivation bay. Gaseous chlorine dioxide concentrations in each cultivation bay are continuously monitored throughout each experiment. Plant biomass loads are created in two of the three cultivation bays by introducing various selected controlled environmental agriculture crops in various stages of development for different iterations of the experiment outlined herein. Calculated and/or measured plant biomass parameters are determined for each test crop, prior to and/or during the course of experimental testing. Crop health and/or crop quality parameters are likewise monitored or evaluated during and/or following experimental testing to evaluate the impact of chlorine dioxide treatment on crop health and quality.

Gaseous chlorine dioxide is dispensed in a test cultivation bay at a first concentration. A first control cultivation bay with experimental plant biomass receives no chlorine dioxide treatment. A second control bay not subject to experimental plant biomass receives the same chlorine dioxide treatment as the test cultivation bay. Chlorine dioxide concentration levels in the test and control bays are continuously monitored in parallel with the airborne microbial population sampling to establish a baseline measured chlorine dioxide concentration curve, a baseline crop health and/or crop quality curves for the selected experimental crop serving as the test plant biomass, and chlorine dioxide and crop health and/or crop quality curves for the test cultivation bay in which both are present and interacting. Test and control curves are compared to determine the plant biomass dependent chlorine dioxide consumption rate under characterized environmental conditions. The experiment is repeated with changes to variables including the selected crop type and developmental stage, dispensed chlorine dioxide levels, and various environmental condition parameters including temperature, relative humidity, light intensity, presence of soil media, presence of airborne or plant-borne microorganisms, and the like, to empirically elucidate the interactions of various plant biomass conditions and environmental parameter conditions on consumption of gaseous chlorine dioxide in a controlled environmental agriculture setting.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Devices, systems, and methods are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or device that comprises a list of elements does not include only those elements but may include other elements not expressly listed or inherent to such process, method, article, or device.

What is claimed is:

1. A system comprising:
    a sensor to measure a state parameter, wherein the state parameter comprises a gaseous chlorine dioxide concentration dispersed in an environment of a facility;
    a control system in electronic communication with the sensor to read the state parameter, wherein the control system is configured to control a consumption device to remove, during a single treatment period, a controlled amount of a chemical microorganism control agent present in the environment of the facility in response to the control system assessing the state parameter, wherein the control system is further configured to maintain a first chemical microorganism control agent concentration for the single treatment period; and
    a generation device in electronic communication with the control system and configured to increase a level of the chemical microorganism control agent in response to the control system assessing the state parameter, wherein the chemical microorganism control agent comprises chlorine dioxide gas.

2. The system of claim 1, further comprising the consumption device in electronic communication with the control system.

3. The system of claim 2, wherein the control system maintains a state-action space comprising:
    a plurality of state parameters including the state parameter; and
    a plurality of action parameters corresponding to operating at least one of the generation device or the consumption device.

4. The system of claim 3, wherein the control system assesses the state parameter by looking up a state-action vector from the state-action space having a dimension matching the state parameter.

5. The system of claim 3, wherein the control system is configured to receive a feedback parameter from the generation device or the consumption device.

6. The system of claim 5, wherein the control system is configured to assess the feedback parameter by looking up a state-action vector in the state-action space having a dimension matching the feedback parameter.

7. The system of claim 1, wherein the control system is configured to control the level of the chemical microorganism control agent to between about 0.03 parts per million (ppm) to about 5 ppm concentration of the chlorine dioxide gas in the environment.

8. The system of claim 1, wherein the control system is configured to control the level of the chemical microorganism control agent to between about 0.03 parts per million (ppm) to about 0.3 ppm concentration of the chlorine dioxide gas in the environment.

9. The system of claim 1, wherein the consumption device comprises at least one selected from the group of a light control device, a carbon filter, and an air handling device, wherein the consumption device is located in the environment.

10. The system of claim 1, wherein the control system is configured to control a rate of removal of the chemical microorganism control agent by the consumption device.

11. A system comprising:
    a sensor installed in a cultivation facility to measure a state parameter in an environment of the cultivation facility, wherein the state parameter comprises a gaseous chlorine dioxide concentration dispersed in the environment;
    a control system in electronic communication with the sensor to read the state parameter;
    a generation device disposed in the cultivation facility and in electronic communication with the control system, the generation device configured to increase a level of a chemical microorganism control agent in response to the control system assessing the state parameter, wherein the chemical microorganism control agent comprises chlorine dioxide gas; and
    a consumption device disposed in the environment of the cultivation facility and in electronic communication with the control system to remove, during a single treatment period, a controlled amount of the chemical microorganism control agent in the environment in response to the control system assessing the state parameter, wherein the control system is further configured to maintain a first chemical microorganism control agent concentration for the single treatment period.

12. The system of claim 11, wherein the control system maintains a state-action space comprising:
   a plurality of state parameters including the state parameter; and
   a plurality of action parameters corresponding to operating at least one of the generation device or the consumption device.

13. The system of claim 12, wherein the control system assesses the state parameter by looking up a state-action vector from the state-action space having a dimension matching the state parameter.

14. The system of claim 12, wherein the control system is configured to receive a feedback parameter from at least one of the generation device or the consumption device.

15. The system of claim 14, wherein the control system is configured to assess the feedback parameter by looking up a state-action vector in the state-action space having a dimension matching the feedback parameter.

16. The system of claim 11, wherein the sensor measures a parts per million (ppm) concentration of the chlorine dioxide gas.

17. The system of claim 11, wherein the control system is configured to control the level of the chemical microorganism control agent to between about 0.03 parts per million (ppm) to about 5 ppm concentration of the chlorine dioxide gas in the environment.

18. The system of claim 11, wherein the control system is configured to control the level of the chemical microorganism control agent to between about 0.03 parts per million (ppm) to about 0.3 ppm concentration of the chlorine dioxide gas in the environment.

19. The system of claim 11, wherein the consumption device comprises at least one selected from the group of a light control device, a carbon filter, and an air handling device.

20. The system of claim 11, wherein the control system is configured to control a rate of removal of the chemical microorganism control agent by the consumption device.

* * * * *